United States Patent [19]

Putrino et al.

[11] Patent Number: 4,914,617
[45] Date of Patent: Apr. 3, 1990

[54] HIGH PERFORMANCE PARALLEL BINARY BYTE ADDER

[75] Inventors: Michael Putrino, Endicott; Stamatis Vassiliadis, Vestal; Eric M. Schwartz, Endicott, all of N.Y.

[73] Assignee: International Business Machines Corporation, Armonk, N.Y.

[21] Appl. No.: 66,580

[22] Filed: Jun. 26, 1987

[51] Int. Cl.$^4$ .............................................. G06F 7/50
[52] U.S. Cl. ................................................. 364/786
[58] Field of Search ....................... 364/784, 786–788, 364/768, 749

[56] References Cited

U.S. PATENT DOCUMENTS

| | | | |
|---|---|---|---|
| 3,683,163 | 8/1972 | Hanslip | 364/749 |
| 4,021,655 | 5/1977 | Healey et al. | 364/749 |
| 4,542,476 | 9/1985 | Nagafuji | 364/749 |
| 4,682,303 | 7/1987 | Uya | 364/788 |

OTHER PUBLICATIONS

*Computer Arithmetic Principles, Architecture, and Design*, Kai Hwang, pp. 84–91.

Primary Examiner—David L. Clark
Assistant Examiner—Long T. Nguyen
Attorney, Agent, or Firm—David S. Romney; John H. Bouchard

[57] ABSTRACT

A parallel binary byte adder performs addition and subtraction on the individual bytes of an A-operand and a B-operand as well as on the entire A and B operand. An A-operand is input to a special adder circuit. A B-operand is modified in a set up logic circuit, in accordance with the specific operation to be performed, before being input to the special adder circuit. A set/mask logic generates set, mask and carry signals which are further input to the special adder circuit. The special adder circuit includes an auxiliary functions circuit and a pseudo carry circuit for generating a set of variables which are processed by a sum circuit to produce three partial results. The first partial result relates to bits 0–5 of the particular byte being processed, the second relates to bit 6, and the third relates to bit 7. A concatenation of the three partial results produces a final sum or difference of the particular byte or bytes involved.

20 Claims, 11 Drawing Sheets

HIGH PERFORMANCE PARALLEL BINARY BYTE ADDER

CROSS REFERENCE TO RELATED APPLICATION

This application is related to copending U.S. patent application Ser. No. 66,364, entitled "Parallel Adder Having Removed Dependencies" filed June 25, 1987, owned by the assignee of this application, and incorporated herein by reference.

BACKGROUND OF THE INVENTION

The subject matter of this invention involves computing systems, and more particularly, a parallel configured adder circuit for use in such computing systems.

Computing systems must include adders to perform regular addition and subtraction. Such adders are typically designed by first developing Boolean equations from which the adders are implemented. Unless these equations are properly modified using certain "minimization" techniques, the adder, resulting from these Boolean equations, experiences an unacceptable delay, in performing regular addition and regular subtraction. In addition, such adders do not perform byte addition and byte subtraction as well as regular addition and regular subtraction.

A traditional formulation of the addition function is described in sections 3.8 and 3.9 of a book entitled "Computer Arithmetic Principles, Architecture, and Design", by Kai Hwang, pages 84–91. This formulation depends, delay-wise, on two paths: (1) one that produces the half sums and (2) one that produces the carries. The recursive formulas are:

$$SUM_i = H_i \vee C_{i+1}$$

$$C_i = G_i + T_i C_{i+1}$$

This formulation is extremely slow because it requires $H_i$, which is an immediate computation, and $C_{i+1}$, which depends on the calculation of the previous carry $(C_{i+2})$.

A better solution, using the same formulation, can be achieved using the carry look ahead (CLA) technique, also described in the above mentioned book by Kai Hwang. However, while this solution is an improvement over the traditional formulation mentioned above, the carry still lies on the critical path. The SUM can be computed either implicitly or explicitly. The SUM is computed implicitly by producing a carry propagating from a previous group of bits and using a formulation for the SUM that involves that carry. The SUM is computed explicitly by producing the carry in the particular bit position and using an exclusive-OR to produce the SUM. Implicit calculations will produce the SUM in one additional stage after producing the carry into that group; and the explicit calculations will produce the SUM in two stages after the production of the carry into a group. The critical path, delay-wise, is due to the production of the carries. The SUM requires at least one stage after the creation of the appropriate carry, for either implicit or explicit calculation. In addition, if other requirements are imposed on the addition, as for example, byte addition and/or byte subtraction, the previously described formulation must be appropriately changed. If this has to be done, a carry must be provided for the byte boundaries (not for an arbitrary group of bits) which may not be the most convenient choice, delay-wise; the carry equation must be expanded so as to include the conditions required for masking and/or setting the carry; the SUM equations may need to be changed to respect the needed operations; and additional delay may be added to the critical path. To improve the delay necessary to calculate the SUM, critical quantities must be produced that require less delay than the carries; and the SUM must be produced in such a way so as to require Boolean expressions that can be implemented with the same or less delay as for the traditional formulation.

SUMMARY OF THE INVENTION

Accordingly, it is a primary object of the present invention to provide a new implementation of a parallel configured adder circuit for use in computing systems.

It is a further object of the present invention to provide an adder which is capable of performing byte addition and byte subtraction as well as regular addition and regular subtraction with only a minimum of delay.

These and other objects of the present invention are accomplished by designing an adder circuit, for use in a computing system, utilizing parallel construction techniques. The adder circuit, of the present invention, improves overall delay by creating new quantities, called pseudo-carries $(S_i)$, that are not equivalent or equal to the carries. In addition, byte addition and subtraction is imbedded into those pseudo-quantities. $S_i$ requires less hardware and less delay with respect to their implementation as opposed to the implementation of the carries. New SUM equations have been created that maintain equivalence with the addition function via auxiliary functions, the pseudo-carry $(S_i)$, and Boolean equations representing the SUM. The new SUM equations can be implemented with one stage of delay after the production of the pseudo-carries. The new formulation of the SUM not only includes regular addition, but it also includes byte addition and byte subtraction. Because the new formulation is better, delay-wise, than the traditional formulation with respect to normal addition, it results in a far greater advantage when the byte addition/byte subtraction is considered since the byte operations, as discussed previously, will degrade the performance of the adder designed with the traditional formulation. Thus, the new formulation of the function will result in a faster execution time relative to the traditional formulation and it preserves equivalence with respect to addition. The new formulation computes more functions and, when compared to the traditional formulation which is forced to include byte operations, the new formulation will greatly out-perform the traditional formulation from a delay point of view.

In the new formulation of the adder circuit, an A operand and a B operand are input to the adder. The adder performs addition and subtraction of the individual bytes of the operands as well as addition and subtraction of the operands per se. A set up logic manipulates the B operand in a particular fashion in accordance with a specific instruction being executed by the computing system. A Set/Mask logic is also responsive to the specific instruction for either masking or setting a carry or enabling a "don't care" condition associated with the carry. When byte addition/subtraction is being performed, associated with a particular byte of the A operand and the B operand, a carry, resulting from addition or subtraction of the particular byte, can be either masked from the addition/subtraction operation associated with the next byte of the A operand/B operand undergoing addition/subtraction or forced (set) into the addition/subtraction operation associated with the next byte of the A operand/B operand undergoing addition/subtraction. The Set/Mask logic could enable a "don't care" condition, with regard to such carry. In this condition, the carry, resulting from byte addition/byte subtraction of the particular byte, would be either carried over or not carried over to the byte addition/byte subtraction operation associated with the next byte of the A operand/manipulated B operand in accordance with the naturally occurring existence of such carry in response to the operations on the particular byte of the operands involved. A special adder circuit is responsive to the A operand, an output of the set up logic, and an output of the Set/Mask logic for performing an operation on bits 0-5 of the particular byte, associated with the A operand and the manipulated B operand undergoing addition/subtraction, performing an operation on bit 6 of the particular byte of the A and manipulated B operands, performing an operation on bit 7 of the particular byte of the A and manipulated B operands, and concatenating the results of the operations associated with bits 0-5, bit 6, and bit 7 of the particular byte of the A operand and the manipulated B operand. The concatenated results represent the sum or difference of the particular byte associated with the A operand and the manipulated B operand.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figure 1:
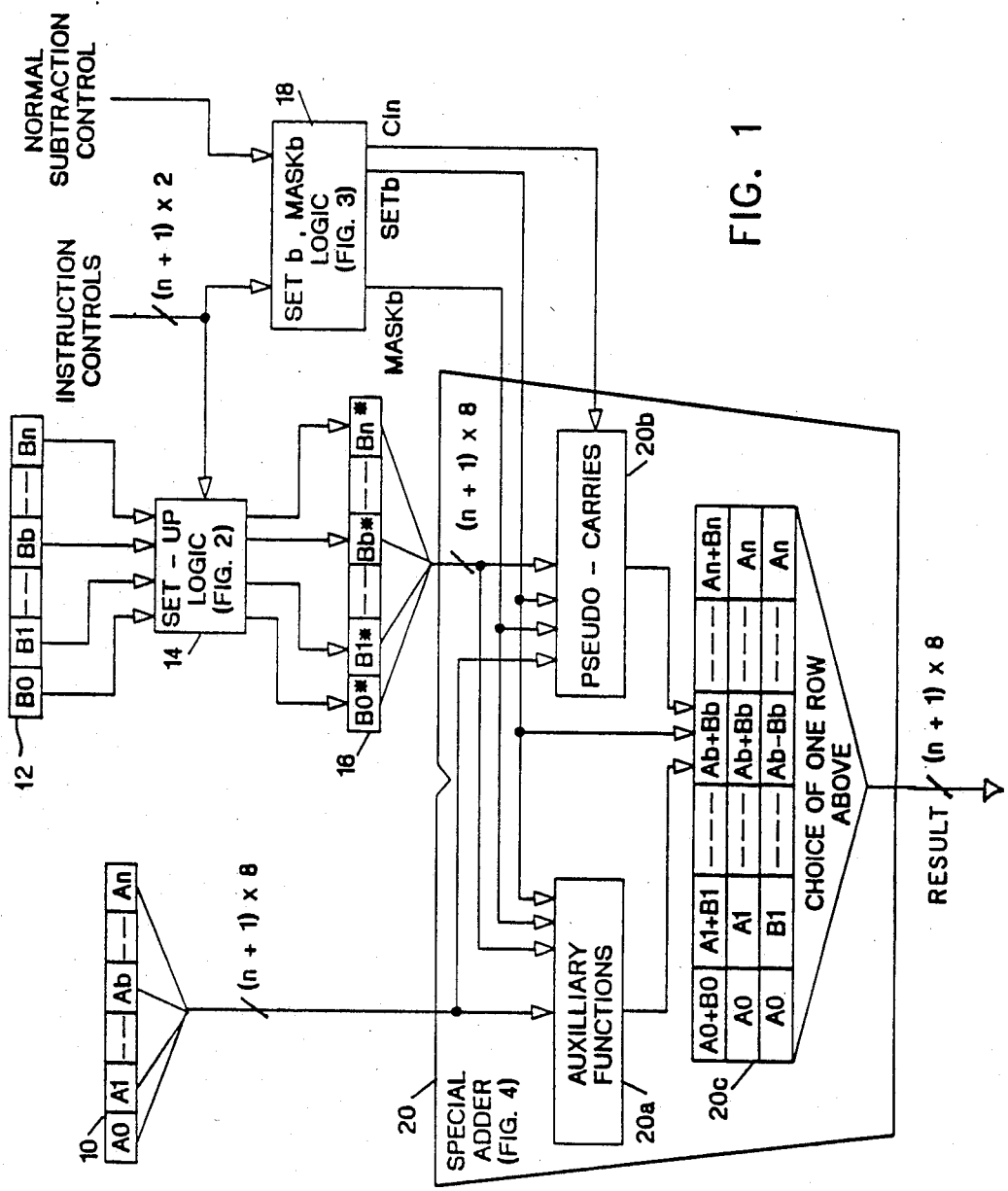
FIG. 1 illustrates an arithmetic unit representing an adder circuit of the present invention including a set up logic circuit, a set/mask logic circuit, and a special adder circuit responsive to the set up logic and the set/mask logic.

Referring to FIG. 1, a diagram of the parallel adder of the present invention is illustrated.

In FIG. 1, an A-operand 10 is input to a special adder 20. A B-operand (B0-Bn) 12 is input to a set up logic circuit 14. The set up logic 14 is further input to a register 16 which contains a modified B-operand (B0*-Bn*) 12, the set up logic 14 being responsive to certain instruction controls. The modified B-operand in register 16 is input to the special adder 20. A set/mask logic circuit 18 is responsive to the instruction controls and normal subtraction controls. The set/mask logic 18 develops a mask output signal, a set output signal and a carry (Cin) output signal, each of these signals being input to the special adder circuit 20. The special adder 20 includes an auxiliary functions circuit 20a which is responsive to the A-operand, the modified B-operand, the mask output signal and the set output signal; a pseudo-carries circuit 20b responsive to the A-operand, the modified B-operand, the mask output signal, the set output signal, and the carry (Cin) output signal. A sum circuit 20c is responsive to the auxiliary functions circuit 20a, the pseudo-carries circuit 20b, and the set signal for providing a resultant sum of the A-operand and the modified B-operand in accordance with the mask output signal, the set output signal and the Cin signal. The sum circuit 20c determines a first sum representing the sum of the bits 0-5 associated with the A-operand and the modified B-operand, determines a second sum representing the sum of the bit 6 associated with the A-operand and the modified B-operand, determines a third sum representing the sum of the bit 7 associated with the A-operand and the modified B-operand, and concatenates the first sum with the second sum yielding a result, and concatenates the result with the third sum yielding a final result which is generated as an output signal therefrom, the final result being the sum of the A-operand and the B-operand, the summation being performed in accordance with the instruction controls and normal subtraction control.

Figure 2:
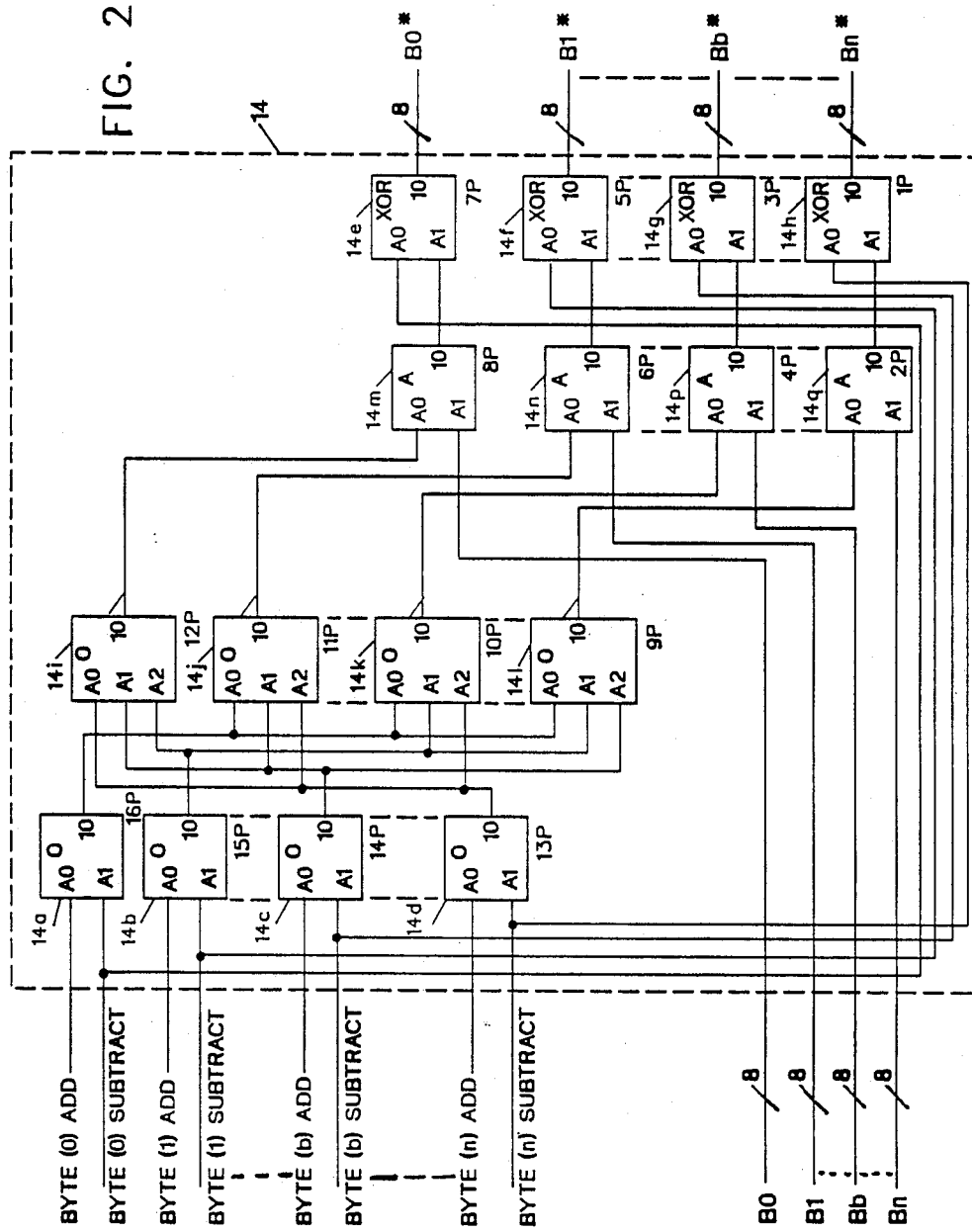
FIG. 2 illustrates a construction of the set up logic circuit of FIG. 1.

Referring to FIG. 2, a construction of the set up logic 14 is illustrated. In FIG. 2, as illustrated in FIG. 1, the set up logic 14 receives the B-operand and the instruction controls. The instruction controls include the Byte(0) Add, the Byte(0) subtract, the Byte(1) Add, the Byte(1) subtract, . . . , the Byte(b) Add, the Byte(b) Subtract, . . . , the Byte(n) Add, and the Byte(n) Subtract. The B-operand includes B0, B1, . . . , Bb, . . . , and Bn. The instruction controls of FIG. 2 energize a first group of OR gates 14a, 14b, 14c, and 14d and a first group of exclusive OR (XOR) gates 14e through 14h. The outputs of the first group of OR gates 14a-14d energize the inputs of a group of NOR gates 14i through 14L. The outputs of the group of NOR gates 14i-14L energize the inputs of a first group of AND gates 14M, 14N, 14P, 14Q. The outputs of AND gates 14M, 14N, 14P, 14Q energize the inputs of XOR gates 14e-14h. Finally, the B-operand B0-Bn energizes the respective inputs of the first group of AND gates 14M, 14N, 14P, and 14Q. The outputs of the XOR gates 14e-14h are the modified B-operand B0*-Bn*.

In operation, the set up logic 14 of FIG. 2 is responsive to the B-operand B0-Bn and to the instruction controls and it functions to modify the B-operand B0-Bn in accordance with the instruction controls thereby producing the modified B-operand B0*-Bn*.

Figure 3:
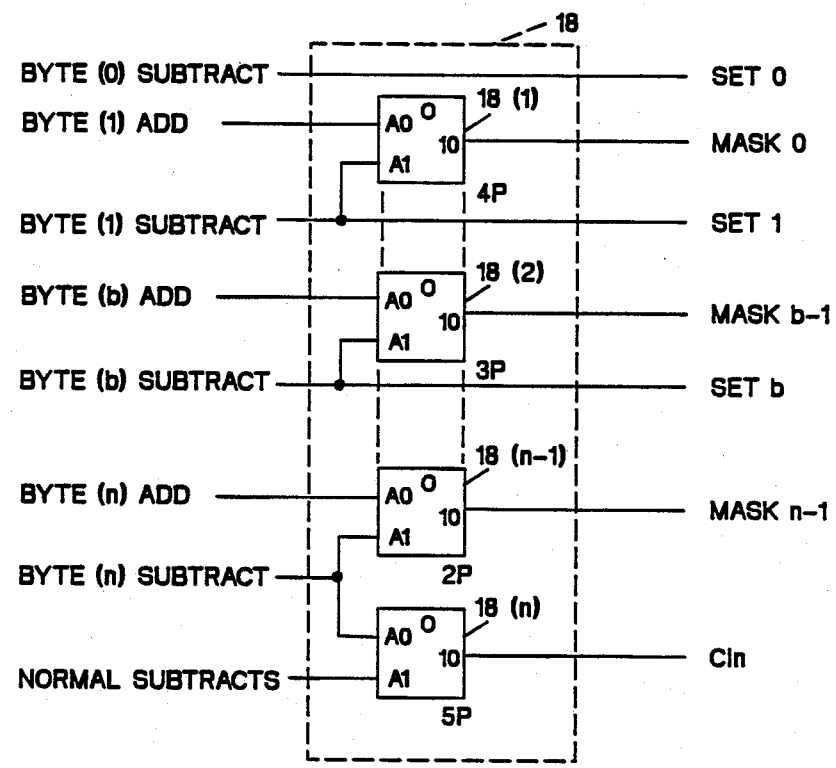
FIG. 3 illustrates a construction of the set/mask logic circuit of FIG. 1.

Referring to FIG. 3, a construction of the set/mask logic 18 is illustrated. As indicated in FIG. 1, the set/mask logic receives the instruction controls and the normal subtraction controls and generates a mask output signal, a set output signal, and a carry (Cin) output signal. In FIG. 3, the instruction controls are input to OR gates 18(1) through 18(n). The outputs of these OR gates 18(1)-18(n) are set and mask output signals set0, mask0; set1, maskb−1, setb, maskn−1. The carry output signal (Cin) is output from the OR gate 18(n).

In operation, the set/mask logic 18 either forces a carry to pass over to, inhibits a carry from passing over to, or enables a "don't care" condition in relation to passing a carry over to a next byte from a preceding byte when two corresponding preceding bytes of data are undergoing an arithmetic operation. For example, consider the following addition operation involving two pieces of binary data, one piece being B0-B3, another piece being B0'-B3':

```
B0  B1  B2  B3
B0' B1' B2' B3'
```

If set(2)=1 and mask(2)=0, where 2 represents the third byte of data of the first and second pieces of binary data B2 and B2', when the operation B3+B3' is performed, if a carry "1" normally results from the operation, the carry "1" is forced to carry over to the next byte of data B2 and B2' regardless of the natural order of the operation due to the set(2)=1. The forcing of this carry requires the "1" to be considered in the operation B2+B2' regardless of the need or requirement for such a carry in the B2/B2' operation. However, if set(2)=0 and mask(2)=1, the carry "1" is inhibited or prevented from carrying over to the next byte of data B2 and B2'. The inhibiting of this carry absolutely prevents the "1" from being considered in the operation B2+B2'. If set(2)=0 and mask(2)=0, the carry "1" will be either carried over or not carried over to the next byte in accordance with the natural order of the operation, i.e., if a carry results, it will be carried over to the next byte but if the carry does not result, it will not be carried over to the next byte.

Figure 4:
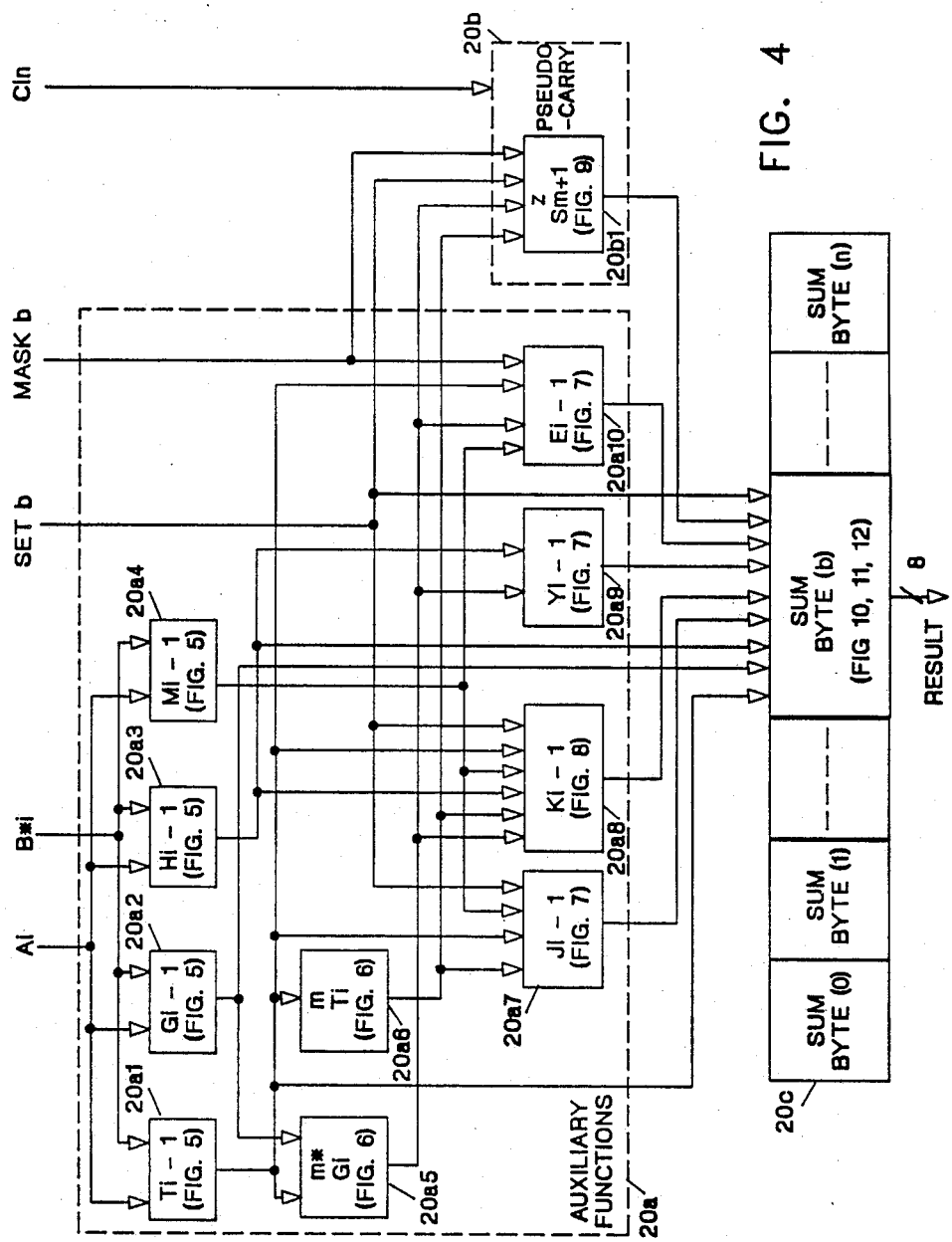
FIG. 4 illustrates a construction of the special adder circuit of FIG. 1 including an auxiliary functions circuit, a pseudo-carry circuit and a SUM byte(b) circuit.

Referring to FIG. 4, a construction of the special adder circuit 20 is illustrated. In FIG. 4, the construction of the auxiliary functions circuit 20a, the pseudo-carry circuit 20b and the SUM circuit 20c may each be described in terms of a Boolean expression.

The auxiliary functions circuit 20a is described by the following Boolean expressions:

$$m = (b \times 8) - 1$$

where b corresponds to the enumeration of the bytes;

$$Ji-1 = Mi-1 T(i+1,m)(Tm+1+SETb)$$

$$Ki-1 = Mi-1 G^*(i,m) + Hi-1(T(i+1,m)(Tm+1+SETb))'G^*(i,m)'$$

$$Yi-1 = Hi-1 G^*(i,m)'; \text{ and}$$

$$Ei-1 = Mi-1(G^*(i,m) + Ti'MASKb)$$

The pseudo-carry circuit 20b is described by the following Boolean expressions:

$$S(m+1,z) = MASKb'G^*(m+1,z) + MASKb'T(m+2,z+1)S(z+1,k) + SETb$$

The SUM circuit 20c is described by the following Boolean expressions:

$$SUMi-1 = (Ji-1+Ki-1)S(m+1,z) + (Yi-1+Ei-1)S(m+1,z)' \quad (1)$$

where $Ji-1$, $Ki-1$, $S(m+1,z)$, $Yi-1$, $Ei-1$, and $S(m+1,z)'$ are defined above by the expressions representing the pseudo-carry circuit 20b and the auxiliary functions circuit 20a. The Boolean expression (1) above represents the sum of the first six bits (0-5) associated with two respective bytes of data undergoing addition.

$$SUMi + 6 = (Hi + 6'Gi + 7SETb' + Hi + 6Ti + 7' + Hi + 6'Ti + 7SETb + Hi + 6'Ti + 7Ti + 8 + Hi + 6Gi + 7'Ti + 8'SETb')S(i+8,i+15) + (Hi + 6'Gi + 7 + Hi + 6Gi + 7')S(i+8,i+15)' \quad (2)$$

For bit 6 associated with the two respective bytes of data undergoing addition, i.e., bits 6, 14, 22, etc., the Boolean expression (2) above should be used, where i=0, 8, 16, . . .

$$SUMi+7 = (Hi+7Ti+8'SETb' + Hi+7'Ti+8 + Hi+7'SETb)S(i+8,i+15) + Hi+7S(i+8,i+15)' \quad (3)$$

For bit 7 associated with the two respective bytes of data undergoing addition, i.e., bits 7, 15, 23, etc., the Boolean expression (3) above should be used, where i=0, 8, 16, . . .

The other variables, hereinbefore undefined, such as Hi, Ti, and Gi, are fully defined in a proof of the expressions (1) through (3) set forth in Appendix 1 of this specification.

In FIG. 4, the auxiliary function circuit 20a includes the following circuits: a Ti−1 circuit 20a1, a Gi−1 circuit 20a2, an Hi−1 circuit 20a3, an Mi−1 circuit 20a4, a G*(i,m) circuit 20a5, a T(i,m) circuit 20a6, a Ji−1 circuit 20a7, a Ki−1 circuit 20a8, a Yi−1 circuit 20a9, and an Ei−1 circuit 20a10. The Ti−1 circuit 20a1, Gi−1 circuit 20a2, Hi−1 circuit 20a3 and the Mi−1 circuit 20a4 are each responsive to (that is, connected directly to) the A-operand byte (Ai) and the modified B-operand byte (Bi). The G*(i,m) circuit 20a5 is responsive to the Ti−1 circuit 20a1 and the Gi−1 circuit 20a2. The T(i,m) circuit 20a6 is responsive to only the Ti−1 circuit 20a1. The Ji−1 circuit 20a7 is responsive to the T(i,m) circuit 20a6, the Ti−1 circuit 20a1, the Mi−1 circuit 20a4, and to the set output signal from the set/mask logic 18. The Ki−1 circuit 20a8 is responsive to the G*(i,m) circuit 20a5, the T(i,m) circuit 20a6, the Hi−1 circuit 20a3, the Mi−1 circuit 20a4, the Ti−1 circuit 20a1, and the set output signal from the set/mask logic 18. The Yi−1 circuit 20a9 is responsive to the G*(i,m) circuit 20a5 and the Hi−1 circuit 20a3. Finally, the Ei−1 circuit 20a10 is responsive to the Mi−1 circuit 20a4, the G*(i,m) circuit 20a5, the Ti−1 circuit 20a1, and the mask output signal from the set/mask logic 18.

In FIG. 4, the pseudo-carry circuit 20b consists of an S(m+1,z) circuit 20b1 responsive to the T(i,m) circuit 20a6, the G*(i,m) circuit 20a5, the set output signal and the mask output signal from the set/mask logic 18.

In FIG. 4, the SUM circuit 20c is broken down into segments: a sum for byte(0), a sum for byte(1), ..., a sum for byte(b), ..., and a sum for byte(n). As such, it can be seen that the individual bytes of data constituting the A-operand and the modified B-operand are undergoing addition/subtraction or byte addition/subtraction.

Figure 5:
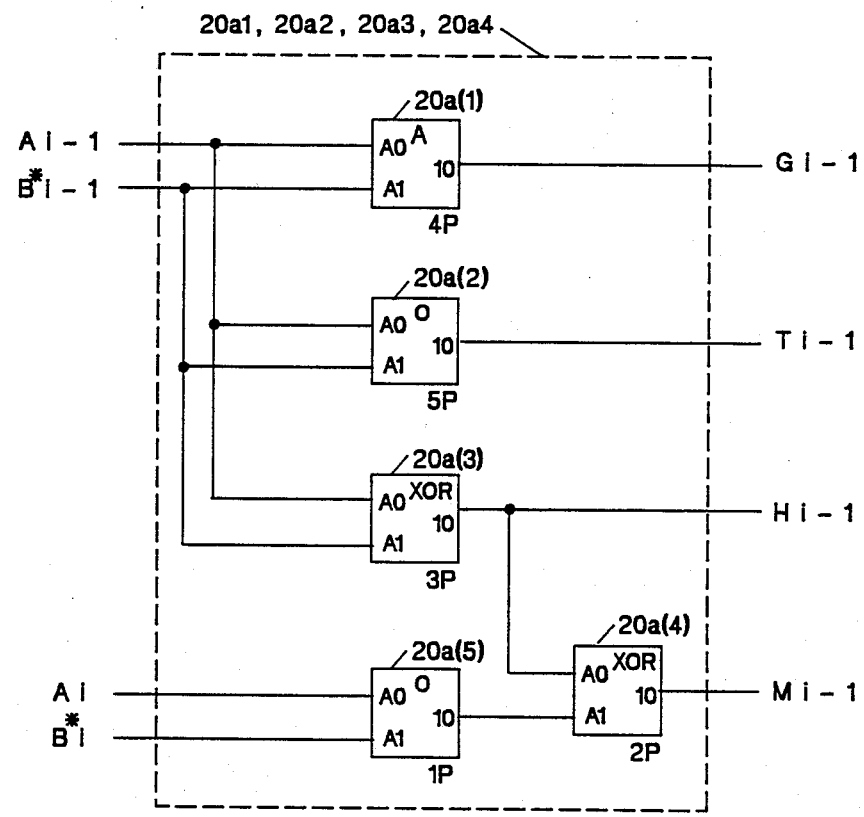
FIGS. 5-8 illustrate the construction of various parts of the auxiliary functions circuit of FIG. 4.

In FIG. 5, a single construction representing each of the Ti−1 circuit 20a1, the Gi−1 circuit 20a2, the Hi−1 circuit 20a3 and the Mi−1 circuit 20a4 of FIG. 4 is illustrated. The Ti−1 circuit generates the Ti−1 signal, the Gi−1 circuit generates the Gi−1 signal, the Hi−1 circuit generates the Hi−1 signal and the Mi−1 circuit generates the Mi−1 signal. In FIG. 5, an AND gate 20a(1), an OR gate 20a(2), an exclusive or (XOR) gate 20a(3) each receive a previous A-operand and a previous modified B-operand Ai−1 and Bi−1, respectively. The outputs of these respective gates generate a Gi−1 signal, a Ti−1 signal, and a Hi−1 signal, respectively. The output of the XOR gate 20a(3) is connected to an input of an XOR gate 20a(4), the other input of the XOR gate 20a(4) being connected to an output of an OR gate 20a(5). The inputs of the OR gate 20a(5) receive the current A-operand and modified B-operand Ai, Bi, respectively. The output of the XOR gate 20a(4) is the Mi−1 signal.

Figure 6:
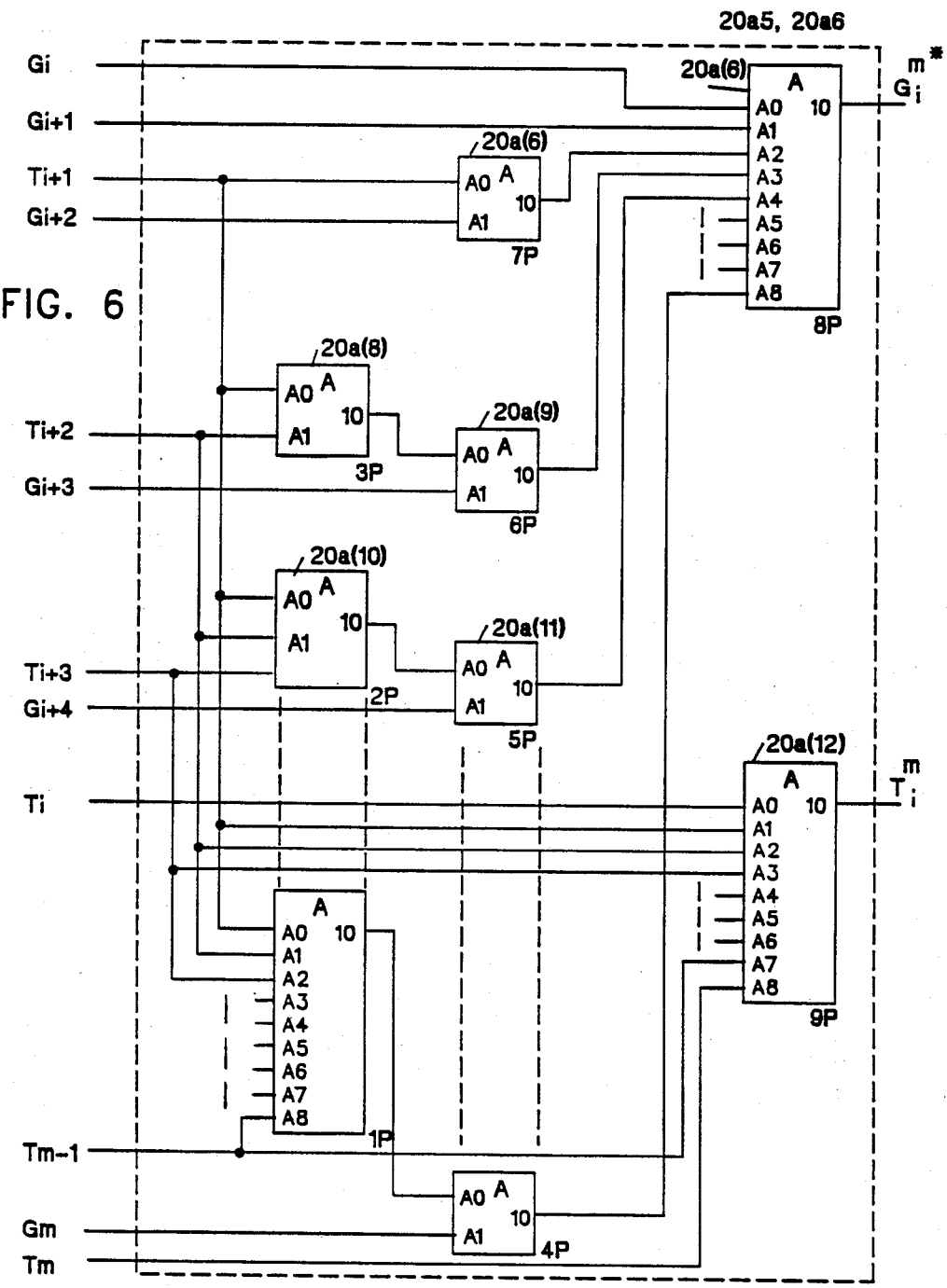

In FIG. 6, a single construction representing each of the G*(i,m) circuit 20a5 and T(i,m) circuit 20a6 of FIG. 4 is illustrated. The G*(i,m) and T(i,m) circuits 20a5, 20a6 receive the outputs of the Ti−1 circuit 20a1 and the Gi−1 circuit 20a2. The output of the Ti−1 circuit 20a1 may be a Ti−1 signal, Ti signal, Ti+1 signal, Ti+2 signal, etc., depending upon the bit position under consideration that the signal is generated for. The same is true of the Gi−1 circuit 20a2. In FIG. 6, the Gi and Gi+1 signals are input directly to OR gate 20a(6). The Ti+1 and Gi+2 signals are input to AND gate 20a(7), the output of which is input to OR gate 20a(6). The Ti+1 and Ti+2 signals are input to AND gate 20a(8), the output of which is input to AND gate 20a(9) along with the Gi+3 signal, the output of AND gate 20a(9) being input to OR gate 20a(6). The Ti+1, Ti+2, Ti+3 signals are AND'd in AND gate 20a(10) yielding a composite Ti signal which is further AND'd in AND gate 20a(11) with corresponding Gi+4 signal, the output of which is input to OR gate 20a(6). The progression is obvious: the Ti signals are AND'd generating a composite Ti signal; the composite Ti signal is AND'd with corresponding Gi signals, the output of which is input to OR gate 20a(6). The output of the OR gate 20a(6) is G*(i,m), the output of the G*(i,m) circuit 20a5 of FIG. 4. Further, all Ti signals, such as Ti, Ti+1, Ti+2, Ti+3, ..., Tm−1, Tm are input to AND gate 20a(12), the output of which is T(i,m), the output of the T(i,m) circuit 20a6 of FIG. 4.

Figure 7:
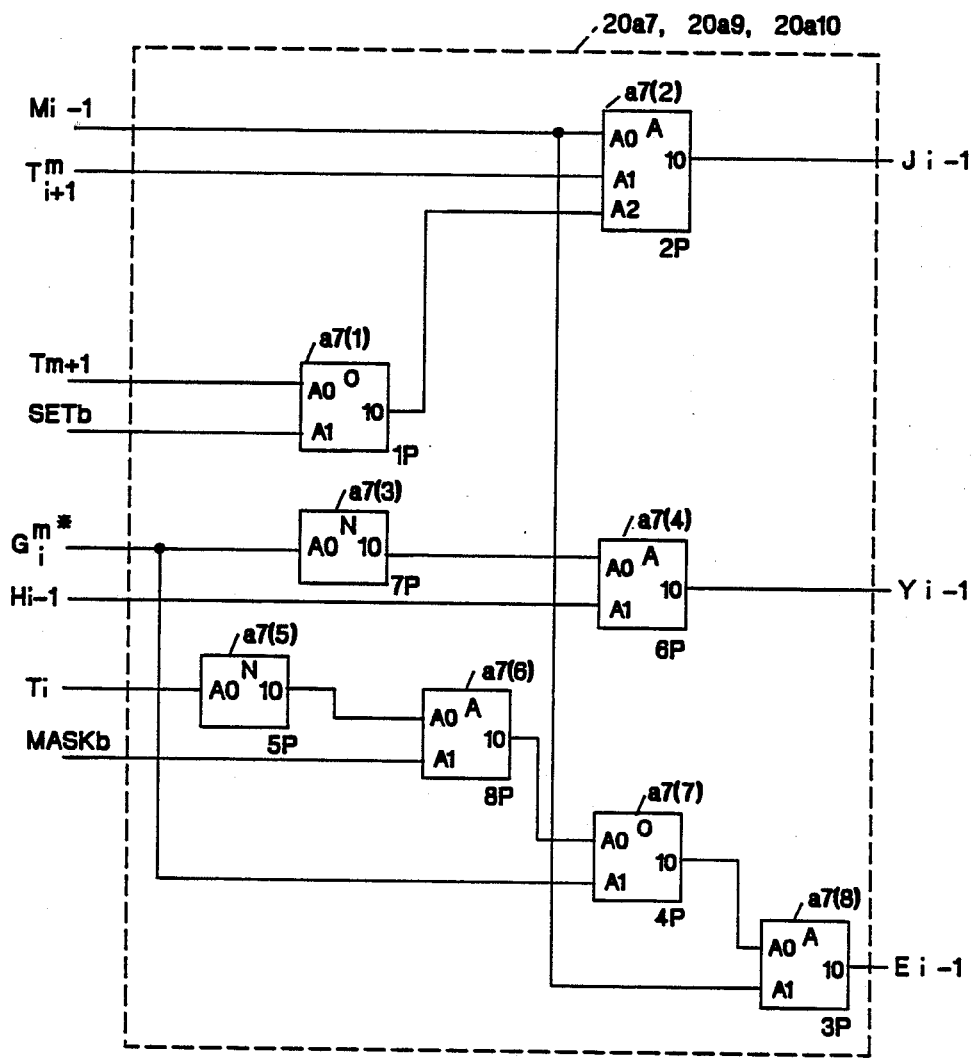

Referring to FIG. 7, a single construction representing each of the Ji−1 circuit 20a7, Yi−1 circuit 20a9, and Ei−1 circuit 20a10 of FIG. 4 is illustrated. In FIG. 4, the Ji−1 circuit, Yi−1 circuit and Ei−1 circuit are all responsive to the following signals: T(i,m) signal from the T(i,m) circuit 20a6, Ti signals from the Ti−1 circuit 20a1, Mi signals from the Mi−1 circuit 20a4, set output signal from the set/mask circuit 18, G*(i,m) signal from the G*(i,m) circuit 20a5, Hi signals from the Hi−1 circuit 20a3, and mask output signal from the set/mask circuit 18. In FIG. 7, the Mi signals are Mi−1, the T(i,m) signals are T(i+1,m), the Ti signals are Ti and Tm+1, and the Hi signals are Hi−1. The outputs of FIG. 7 are signals Ji−1, Yi−1 and Ei−1. The circuit of FIG. 7 includes OR gate a7(1), AND gate a7(2), inverter a7(3), AND gate a7(4), inverter a7(5), AND gate a7(6), OR gate a7(7), and AND gate a7(8).

Figure 8:
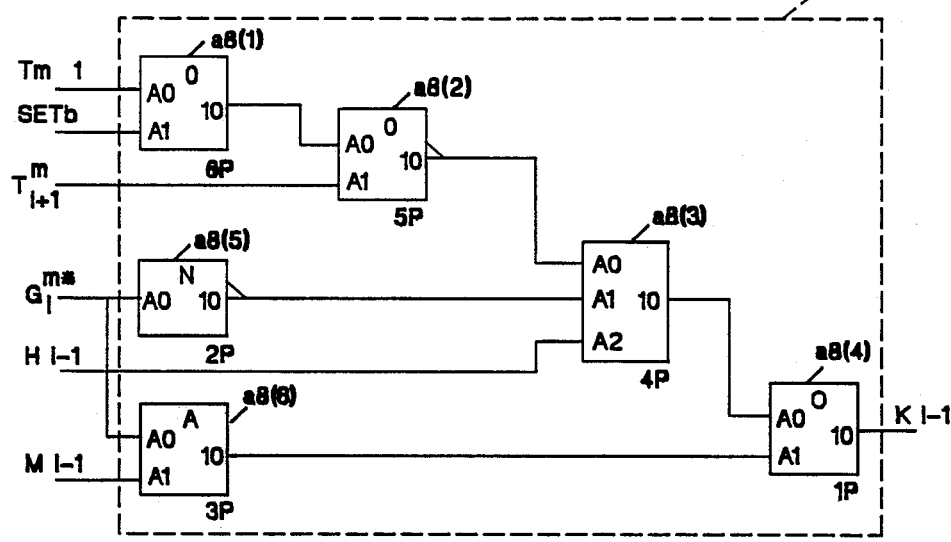

Referring to FIG. 8, a construction of the Ki−1 circuit 20a8 of FIG. 4 is illustrated. In FIG. 8, the Ki−1 circuit 20a8 is responsive to the following signals: T(i,m) signal from the T(i,m) circuit 20a6 (T(i+1,m)), Ti signals from the Ti−1 circuit 20a1 (Tm+1), Mi signals from the Mi−1 circuit 20a4 (Mi−1), set output signal from the set/mask circuit 18, G*(i,m) signal from the G*(i,m) circuit 20a5 (G*(i,m)), and Hi signals from the Hi−1 circuit 20a3 (Hi−1). The output of FIG. 8 is the Ki−1 signal. The Ki−1 circuit 20a8 of FIG. 8 includes OR gate a8(1), NAND gate a8(2), AND gate a8(3), OR gate a8(4), inverter a8(5), and AND gate a8(6).

Figure 9:
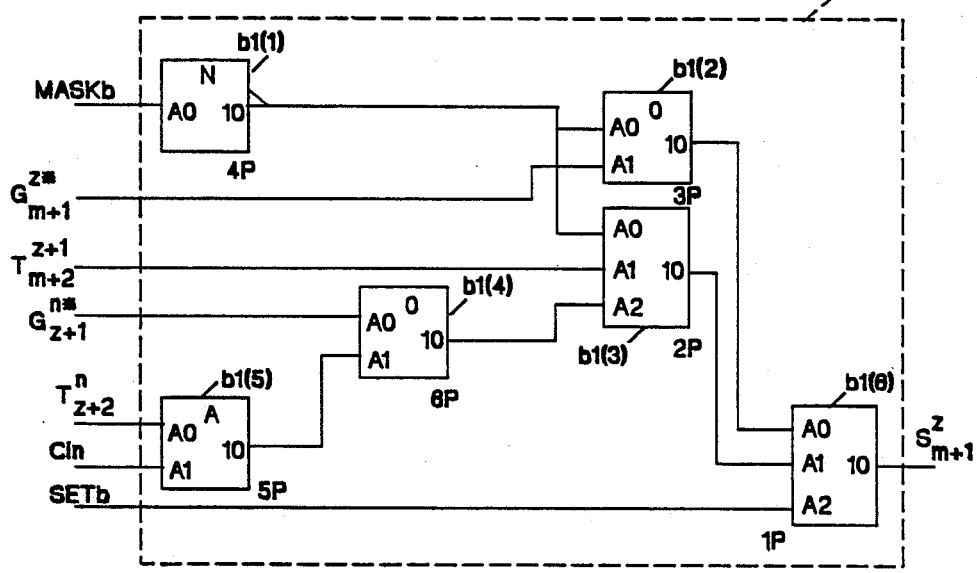
FIG. 9 illustrates a construction of the pseudo-carry circuit of FIG. 4.

Referring to FIG. 9, a construction of the S(m+1,z) circuit 20b1 associated with the pseudo-carry circuit 20b of FIGS. 1 and 4 is illustrated. In FIG. 9, the S(m+1,z) circuit 20b1 is responsive to the following signals: Cin, set output signal and mask output signal from the set/mask logic 18 of FIG. 1, output signals from the G*(i,m) circuit 20a5 of FIG. 4, and output signals from the T(i,m) circuit 20a6 of FIG. 4. In FIG. 9, the G*(i,m) signals appear as signals G*(m+1,z), G*(z+1,n) and the T(i,m) signals appear as signals T(m+2,z+1), T(z+2,n). The output of the S(m+1,z) circuit 20b1 of FIG. 9 is S(m+1,z). The S(m+1,z) circuit 20b1 of FIG. 9 includes inverter b1(1), AND gate b1(2), AND gate b1(3), OR gate b1(4), AND gate b1(5), and OR gate b1(6).

Figure 10:
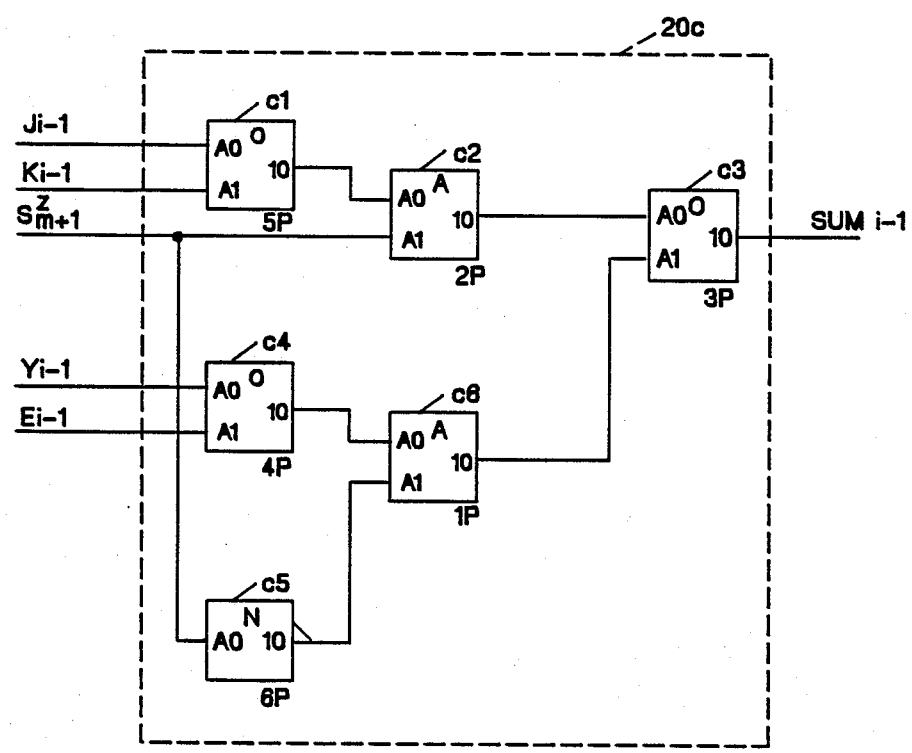
FIGS. 10-12 illustrates a construction of the SUM byte(b) circuit of FIG. 4.
Figure 11:
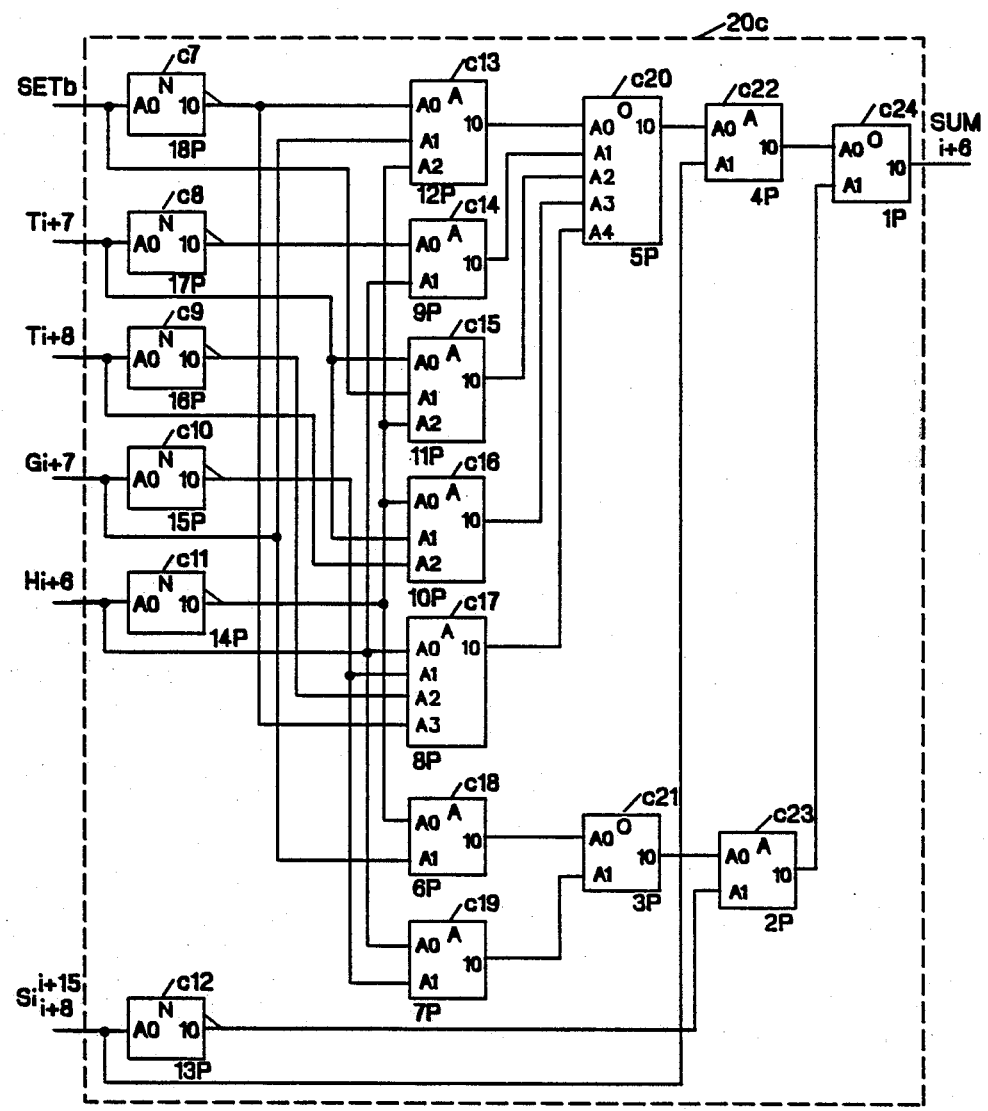
Figure 12:
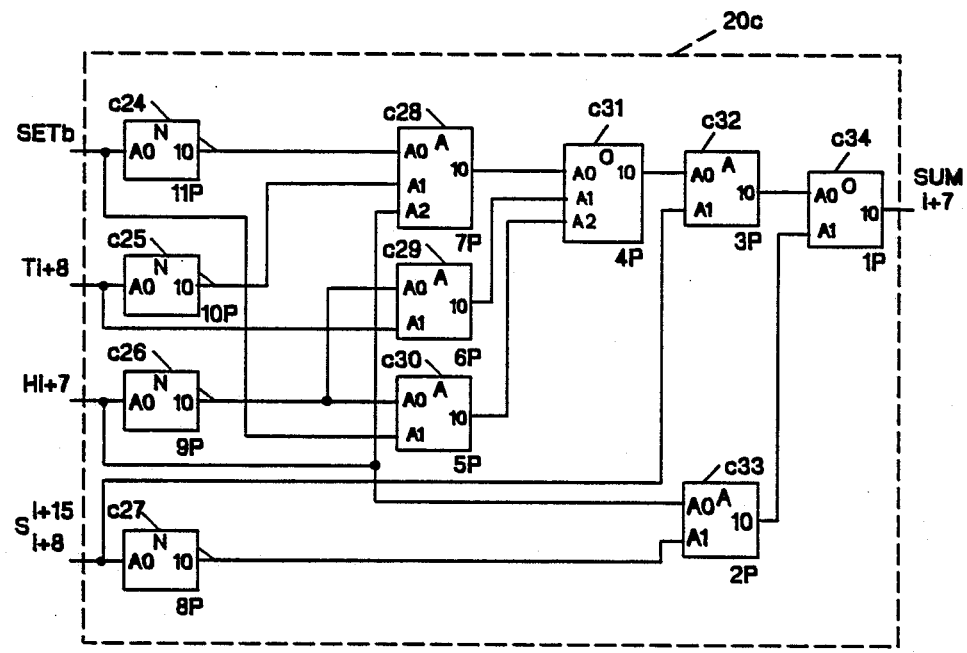

Referring to FIGS. 10, 11, and 12, a construction of the SUM circuit 20c of FIG. 4 is illustrated. In FIG. 4, note that the SUM circuit 20c receives the output signals from the auxiliary functions circuit 20a and from the pseudo-carry circuit 20b and, in response thereto, generates the "result" of the summation of the A-operand and the B-operand. The "result" is defined by the sum equations set forth above and duplicated below. SUMi−1 is the output signal of FIG. 10 and appears in equation (1) below, SUMi+6 is the output signal of FIG. 11 and appears in equation (2) below, and SUMi+7 is the output signal of FIG. 12 and appears in equation (3) below:

$$SUMi-1 = (Ji-1+Ki-1)S(m+1,z)+(Yi-1+Ei-1)S(m+1,z)' \quad (1)$$

where Ji−1, Ki−1, S(m+1,z), Yi−1, Ei−1, and S(m+1,z)′ are defined above by the expressions representing the pseudo-carry circuit 20b and the auxiliary functions circuit 20a. The Boolean expression (1) above represents the sum of the first six bits (0–5) associated with two respective bytes of data undergoing addition.

$$SUMi + 6 = (Hi + 6'Gi + 7SETb' + Hi + \quad (2)$$
$$6Ti + 7' + Hi + 6'Ti + 7SETb +$$
$$Hi + 6'Ti + 7Ti + 8 +$$
$$Hi + 6Gi + 7'Ti + 8'SETb')S(i + 8, i + 15) +$$
$$(Hi + 6'Gi + 7 + Hi + 6Gi + 7')S(i + 8, i + 15)'$$

For bit 6 associated with the two respective bytes of data undergoing addition, i.e., bits 6, 14, 22, etc., the Boolean expression (2) above should be used, where i=0, 8, 16, ...

$$SUM_{i+7}=(H_{i+7}T_{i+8}'SETb'+H_{i+7}'T_{i+8}+H_{i+7}'SETb)S(i+8,i+15)+H_{i+7}S(i+8,i+15)' \quad (3)$$

For bit 7 associated with the two respective bytes of data undergoing addition, i.e., bits 7, 15, 23, etc., the Boolean expression (3) above should be used, where i=0, 8, 16, ...

In FIG. 10, the result $SUM_{i-1}$ is generated from a circuit comprising OR gate c1, AND c2, OR gate c3, OR gate c4, inverter c5 and AND gate c6. OR gate c1 receives the $J_{i-1}$ signal and the $K_{i-1}$ signal from the FIG. 7, 8 circuit, respectively, and AND gate c2 and inverter c5 receive the S(m+1,z) signal from the FIG. 9 pseudo-carry circuit 20b. OR gate c4 receives the $Y_{i-1}$ signal and the $E_{i-1}$ signal from the FIG. 7 circuit. AND gates c2 and c6 feed into the OR gate c3, which provides the $SUM_{i-1}$ output signal.

In FIG. 11, the result $SUM_{i+6}$ is generated from a circuit comprising inverters c7 through c12, AND gates c13 through c19, OR gates c20-c21, AND gates c22-c23, and OR gate c24 which provides the output SUM signal $SUM_{i+6}$. Inverter c7 receives the set output signal, inverters c8-c11 receive the Ti, Gi and Hi output signals from the $T_{i-1}$ circuit 20a1, $G_{i-1}$ circuit 20a2, and $H_{i-1}$ circuit 20a3 of FIG. 4. Inverter c12 receives the S(i+8,i+15) output signal from the pseudo-carry circuit 20b1 of FIG. 9.

In FIG. 12, the result $SUM_{i+7}$ is generated from a circuit comprising inverters c24-c27, AND gates c28-c30, OR gate c31, AND gates c32-c33, and OR gate c34, which provides the output SUM signal $SUM_{i+7}$. Inverter c24 receives the set output signal from the set/mask logic 18, inverters c25 and c26 receive the Ti and Hi output signals from the $T_{i-1}$ circuit 20a1 and the $H_{i-1}$ circuit 20a3 of FIG. 4. Inverter c27 receives the S(i+8,i+15) output signal from the pseudo-carry circuit 20b1 of FIGS. 4 and 9.

A functional description of the operation of the parallel adder of the present invention will be described in the following paragraphs with reference to FIG. 1 of the drawings.

In FIG. 1, the parallel adder of the present invention is illustrated. There are four different types of operations performed by the parallel "byte" adder of FIG. 1:
1. Regular Addition
2. Regular Subtraction
3. Byte Addition
4. Byte Subtraction For the purpose of this discussion, assume two operands A and B. Each such operand is 32 bits long, although whatever conclusions are drawn below with respect to the 32 bit operand may also be drawn with respect to any other width operand. The operands A and B are represented as follows:
A=(A0 A1 A2 ... A29 A30 A31)
B=(B0 B1 B2 ... B29 B30 B31)
In FIG. 1, the following operations are performed on the 32 bit "A" operand and the 32 bit "B" operand:

1. Regular Addition

A+B=(A0 A1 A2 ... A29 A30 A31)+(B0 B1 B2 ... B29 B30 B31)

where "+" indicated addition.

2. Regular Subtraction

A−B=(A0 A1 A2 ... A29 A30 A31)− (B0 B1 B2 ... B29 B30 B31)

where "−" indicated subtraction.

3. Byte Addition "[A+B]byte1"

The A and B operands each include a plurality of bytes. Since the A and B operands are 32 bits in width, there are four (4) bytes in the A operand and four (4) bytes in the B operand: bytes 0, 1, 2, and 3. Byte 0 is the most significant byte, and byte 3 is the least significant byte. In the following discussion, the symbol "||" shall mean "is concatenated with". If byte addition is being performed with respect to byte 1 (the second byte), the following operation is being performed:

[A+B]byte1=[A0 A1 ... A7] || [A8 A9 ... A15]+[B8 B9 ... B15] || [A16 A17 ... A31]

In this operation, the first byte of A is concatenated with the addition of the second byte of A and B concatenated with the third and fourth bytes of A. The same operation may be performed with respect to any other byte.

4. Byte Subtraction "[A−B]byte1"

Assume that byte subtraction is being performed for byte 1, the second byte, as in the byte addition of 3, above. Therefore, the following operation is being performed:

[A−B]byte1=[A0 A1 ... A7] || [A8 A9 ... A15]−[B8 B9 ... B15] || [A16 A17 ... A31]

In this operation, the first byte of A is concatenated with the subtraction of the second byte of B from the second byte of A concatenated with the third and fourth bytes of A. Similarly, the same operation may be performed with respect to any other byte.

In FIG. 1, the parallel adder performs each of the above four types of operations. The A-operand is stored in register 10 and the B-operand is stored in register 12. The A-operand and the B-operand are inputs to the parallel adder of the present invention along with a set of instructions comprising instruction controls and normal subtraction controls. The set up logic 14 receives the B-operand, modifies the B-operand, and produces the modified B-operand B*, the modified B-operand B* being stored in register 16. The B-operand is modified by the set up logic 14 in a manner specific to the particular operation being performed. For example, if a byte addition operation is being performed, the B-operand is modified in a first manner specific to the byte addition operation whereas if a byte subtraction operation is being performed, the B-operand is modified in a second manner specific to the byte subtraction operation. Therefore, the A-operand and the modified B-operand B* are input to the special adder circuit 20. The detailed function of the set up logic 14 will be described later. The setb, maskb logic 18 develops the set output signal, the mask output signal, and the carry output signal Cin, information needed by the special adder circuit 20 to perform the above four operations. The set and mask output signals are utilized to force a carry resulting from a preceding byte to pass over to a next byte undergoing processing, to inhibit a carry resulting from a preceding byte from passing over to a next byte, or to either force or inhibit such carry depending upon the natural order of the operation. The carry output signal "Cin" is set equal to "1" when a subtraction operation is being performed (A−B). The subtraction operation is performed by implementing the following operation: A+B'+1, where "B'" is the inverse of B, and "1" is the carry output signal "Cin"; the difference A−B is the result of this operation minus the first and most significant binary bit (for example, if 1001 is the result, the difference is 001, the first "1" being ignored). The detailed function of the set/mask logic 18 is described below with reference to FIG. 3 of the drawings. The special adder 20 processes each byte of the A-operand and the modified B-operand, one byte at a time. The special adder 20 performs one of the above four operations in response to the A-operand, the modified B-operand B*, the mask output signal, the set output signal, and the carry Cin output signal yielding a processed result. The processed result will reflect a byte addition operation if the B-operand is modified in a first manner, as noted below with respect to the set up logic, and the processed result will reflect a byte subtraction operation if the B-operand is modified in a second manner, as noted below with respect to the set up logic.

The functional operation of the set up logic 14 will be described in the following paragraphs with reference to FIG. 2 of the drawings.

The set up logic 14 develops the modified B-operand B* from the B-operand B, B* being input to the special adder 20. The exact format of B* will vary depending upon which one of the above four operations are being performed. Therefore, the set up logic 14 will, from a functional point of view, produce an operand B* from an operand B, for each of the above four operations, in the following manner:

1. Regular Addition

If regular addition is being performed utilizing a B-operand B, then, B*=B. No change is made to the B-operand when producing the modified B-operand B*.

2. Regular Subtraction

If regular subtraction is being performed utilizing a B-operand B, then, B*=B', where B' is the bit-by-bit inversion of B.

3. Byte Addition

If byte addition is being performed on a particular byte of a B-operand B, then, B* is produced from B by zeroing all bytes of B except for the particular byte of B participating in the addition operation. For example, for a 32 bit B-operand, B=[B0 B1 ... B31], when the second byte, byte 1 of bytes 0, 1, 2, 3, is undergoing addition:

B*=[0 0 0 0 0 0 0 0] || [B8 B9 ... B15] || [0 0 0 . . 0]

In this example, to produce B* from B, the first byte of B is zeroed, the second byte of B* is equal to the second byte of B, and the third and fourth bytes of B are zeroed. Similarly, the same operation may be performed with respect to any other byte.

4. Byte Subtraction

If byte subtraction is being performed on a particular byte of a B-operand B, then, B* is produced from B by zeroing all bytes of B except for the particular byte of B participating in the subtraction operation; further, the particular byte of B undergoes a bit-by-bit inversion operation. For example, for a 32 bit B-operand, B=[B0 B1 ... B31], when the second byte, byte 1 of bytes 0, 1, 2, 3, is undergoing subtraction:

B*=[0 0 0 0 0 0 0 0] || [B8' B9' ... B15'] || [0 0 0 . . 0]

where B' is the inverse of B.

In this example, to produce B* from B, the first byte of B is zeroed, the second byte of B is inverted, and the third and fourth bytes of B are zeroed. Similarly, the same operation may be performed with respect to any other byte.

The "instruction controls" of FIG. 1 is input to the set up logic 14. The "instruction controls" includes a particular instruction, the particular instruction instructing the set up logic 14 to perform one of the above four operations. Depending upon the particular instruction being input to the set up logic 14, the set up logic 14 will compute B* from B utilizing one of the four functional operations described above.

The functional operation of the set/mask logic 18 will be described in the following paragraph with reference to FIG. 3 of the drawings.

The output signals of the set/mask logic are the SETb output signal, the MASKb output signal, and the carry "Cin" output signal. For each byte of the A-operand and the modified B-operand (except the least significant byte), there exists a set SETb output signal and a mask MASKb output signal. In our example, the bytes were bytes 0, 1, 2 and 3. For bytes 0 through 2, SETb and MASKb must be provided, and for byte 3, the "Cin" carry output signal must be provided. In FIG. 3, SETb, MASKb, and Cin are computed as follows:

1. For normal addition, MASKb=SETb=Cin=0 for every b.
2. For normal subtraction, MASKb=SETb=0 for every b, and Cin=1.
3. For byte addition on byte 1, and similarly for any other byte, Cin=0, MASK0=1, MASK1=0, MASK2=0, and SET0=0, SET1=0, and SETb=0 for every b.
4. For byte subtraction on byte 1 and similarly with analogous considerations for bytes 0 and 2, Cin=0, MASK0=1, MASK1=0, MASK2=0, SET0=0, SET1=1, and SET2=0. This also holds true for bytes 0 and 2. For byte 3, Cin=1, MASK2=1, and all the others are 0.

From a functional point of view, the SET, MASK and Cin output signals are computed as above for the following reasons:

a. For normal addition, all the masks and sets and the Cin must be equal to zero so that carry propagation due to the natural existence of such carries in response to the operation can occur.

b. For normal subtraction, all the masks and sets must be equal to zero so that carry propagation due to the natural existence of such carries in response to the operation can occur. The Cin must be equal to 1. The adding of 1 (Cin=1) to the modified B operand (in this case, the one's complement of B) will result in B* being equal to −B. Thus, normal subtraction will occur (A+(−B)). For example, assume A=110, B=101, and A−B is the operation; therefore, A−B=001:110 (A)+010 (B')+1 (Cin)=1001; ignore the first "1", thus leaving "001".

c. For byte addition, the carry out of the byte participating in the addition must be suppressed so that it will not affect the higher order bytes. This is done by making the mask of the more significant byte (MASK0) equal to 1.

d. For byte subtraction, the carry into the byte participating in the subtraction must be set by making the set for that byte (SET1) equal to 1. Byte subtraction will then be performed since the one's complement of the participating byte of the B operand is presented in the modified B operand. Also, the carry out of the participating byte must be suppressed so that it will not affect the higher order bytes. This is done by making the mask of the more significant byte (MASK0) equal to 1.

The functional operation of the special adder 20 will be described in the following paragraphs with reference to FIGS. 4–12 of the drawings.

The auxiliary functions circuit 20a receives the A-operand "A", the modified B-operand "B*", SETb, and MASKb, and comprises the following circuits for generating the following output signals in response to A, B*, SETb, and MASKb: $T_{i-1}$, $G_{i-1}$, and $H_{i-1}$ circuits for generating the $T_{i-1}$ output signal, the $G_{i-1}$ output signal, and the $H_{i-1}$ output signal, respectively; $J_{i-1}$, $K_{i-1}$, $Y_{i-1}$ and $E_{i-1}$ circuits for generating the $J_{i-1}$ output signal, the $K_{i-1}$ output signal, the $Y_{i-1}$ output signal and the $E_{i-1}$ output signal, respectively. These output signals are received by the SUM circuit 20c.

The pseudo-carry circuit 20b, 20b1 of FIGS. 1, 4 and 9 changes the carry (Cin) output signal (in FIG. 9) of the set/mask logic 18 in accordance with the set output signal and the mask output signal of the set/mask logic 18, and in accordance with the output signal of the Gi(m) circuit 20a5 and the Ti(m) circuit 20a6 of FIG. 4 (which are functions of the A-operand and the modified B-operand, respectively) and generates the S(m+1,z) output signal representative of that change.

The SUM circuit 20c receives the SETb output signal, received from the set/mask logic 18, the S(m+1,z) output signal, received from the pseudo-carry circuit 20b, and the output signals from the auxiliary functions circuit 20a and, utilizing the "variables" set forth in the output signals from the auxiliary functions circuit 20a, from the pseudo-carry circuit 20b, and set forth in the Set output signal from the set/mask logic 18, generates a result indicative of the sum of a particular byte of the A-operand and the modified B-operand undergoing addition or subtraction. The result is generated in accordance with the following SUM equations:

$$SUM_{i-1} = (J_{i-1} + K_{i-1})S(m+1,z) + (Y_{i-1} + E_{i-1})S(m+1,z)' \quad (1)$$

where $J_{i-1}$, $K_{i-1}$, $S(m+1,z)$, $Y_{i-1}$, $E_{i-1}$, and $S(m+1,z)'$ are defined by the expressions representing the pseudo-carry circuit 20b and the auxiliary functions circuit 20a. The Boolean expression (1) above represents the sum of the first six bits (0–5) associated with two respective bytes of data undergoing addition.

$$SUM_i + 6 = (H_i + 6'G_i + 7SETb' + H_i + \quad (2)$$
$$6T_i + 7' + H_i + 6'T_i + 7SETb +$$
$$H_i + 6'T_i + 7T_i + 8 +$$
$$H_i + 6G_i + 7'T_i + 8'SETb')S(i+8,i+15) +$$
$$(H_i + 6'G_i + 7 + H_i + 6G_i + 7')S(i+8,i+15)'$$

For bit 6 associated with the two respective bytes of data undergoing addition, i.e., bits 6, 14, 22, etc., the Boolean expression (2) above should be used, where i=0, 8, 16, ...

$$SUM_i+7 = (H_i+7T_i+8'SETb'+H_i+7'T_i+8 \\ +H_i+7'SETb)S(i+8,i+15)+H_i+7S(i+8,i+15)' \quad (3)$$

For bit 7 associated with the two respective bytes of data undergoing addition, i.e., bits 7, 15, 23, etc., the Boolean expression (3) above should be used, where i=0, 8, 16, ....

In operation, the special adder 20 is responsive to the A operand, an output of the set up logic 14, and an output of the Set/Mask logic 18 for performing an operation on bits 0–5 of a particular byte, associated with the A operand and the modified B operand undergoing addition or subtraction, performing an operation on bit 6 of the particular byte of the A operand and modified B operand, performing an operation on bit 7 of the particular byte of the A operand and modified B operand, and concatenating the results of the operations associated with bits 0–5, bit 6, and bit 7 of the particular byte of the A operand and the modified B operand. The concatenated results represent the sum or difference of the particular byte associated with the A operand and the modified B operand.

The previously described operations are carried through via the auxiliary functions and pseudo-carries which converge to an appropriate sum equation. The pseudo-carries are neither equivalent nor equal to the carries described by previous art. They result in having less terms, if compared to the traditional description of carries, which translates directly to less hardware and delay when implemented. In addition, the pseudo-carries will compute more function than the traditional carries without adding extra terms as compared to the traditional carries. In order to balance the delay for the function, the auxiliary functions do not produce pseudo-carries into the bits, thus producing the sum in just one stage after the production of the pseudo-carries. Given that the sum equations use the pseudo-carries and the auxiliary functions, the sum equations are different than the traditional formulation, however, they do preserve equivalence to the needed functions, as proven in Appendix 1. The formulation of the addition/subtraction, byte addition/subtraction, as described previously, results in faster execution times and is carried out in a parallel manner and computes more function than the traditional form of the sum. The sum equations are parametric, meaning that they are not bounded by a specific length of operands, i.e., the sum equations can be used in conjunction with any length of operands provided that the pseudo-carries, output from the pseudo-carry circuit 20b, are produced for the byte boundaries required for the special function of byte addition and byte subtraction. In addition, it is derived to be independent of technology implying that the new formulation can be implemented in any technology with no restrictions.

APPENDIX 1

1.0 Notations

1. $V$ = exclusive OR
2. $B'$ = the one's complement of B
3. $SUM_{i-1}$ = the SUM at bit position $i-1$

2.0 Introduction

For ease of discussion, assume a 32-bit adder. By definition, a 32-bit adder that includes byte addition, is one that can add one of the four bytes located in a 32-bit addend, to the corresponding byte located in a 32-bit augend. The additional bytes of the addend will be zeros and the bytes of the augend not contributing to the addition must be passed unaltered to the SUM output.

This implies that, for the unaltered bytes of the augend to be passed to the SUM, the carry out of the byte participating in the addition must be suppressed. Also, if subtraction is to take place, the carry into the participating byte must be set to the "one" condition. Analogous considerations can be applied to the general case of m bit adders.

3.0 Preliminary Background

Assume that:

$$G^*(i,m) = G_i + G_{i+1}T_i + G_{i+2}T_{i+1}T_i + G_{i+3}T_{i+1}T_{i+2} + \ldots + T_{i+1}T_{i+2}T_{i+3} \ldots T_{m-1}G_m \quad (3)$$

$$T(i,m) = T_iT_{i+1}T_{i+2} \ldots T_m - T_m \text{ with } -T_i = A_i + B_i, G_i = A_iB_i \quad (3.0)$$

$$H_i = A_i \, V \, B_i; \quad (3.1)$$

and $$M_i = H_i \, V \, T_{i+1} \quad (3.2)$$

then it can be proven, with proper substitutions, that the set of equations $$SUM_{i-1} = M_{i-1}G^*(i,m) + M_{i-1}T(i+1,m+1)S(m+1,z) + H_{i-1}T(i+1,m+1)'G^*(i,m)' + H_{i-1}G^*(i,m)'S(m+1,z)' \quad (3.3)$$

$$S(m+1,z) = G^*(m+1,z) + T(m+2,z1)S(z+1,k) \quad (3.4)$$

is equivalent to the addition.

4.0 Masking The Carry

In the case of masking, the carry into the byte is considered to be forced to the "zero" state. The carry into the more significant byte adjacent to the byte participating in the addition must be masked off so that it will not affect the value as presented to the SUM.

The SUM equation (3.3) can be written in the following form.

$$=> SUM_{i-1} = Z_{i-1} + M_{i-1}T(i+1,m+1)S(m+1,z) + H_{i-1}G^*(i,m)'S(m+1,z)' \quad (3.3)$$

where $$Z_{i-1} = M_{i-1}G^*(i,m) + H_{i-1}T(i+1,m+1)'G^*(i,m)' = M_{i-1}G^*(i,m) + D_{i-1}G^*(i,m)'$$

and where $$D_{i-1} = H_{i-1}T(i+1,m+1)'$$

Furthermore, $$SUM_{i-1} = Z_{i-1} + W_{i-1}S(m+1,z) + Y_{i-1}S(m+1,z)'$$

where $$W_{i-1} = M_{i-1}T(i+1,m+1)$$

$$Y_{i-1} = H_{i-1}G^*(i,m)'$$

And finally, $$SUM_{i-1} = (W_{i-1} + Z_{i-1})S(m+1,z) + (Y_{i-1} + Z_{i-1})S(m+1,z)' \quad (4.1)$$

where $$\begin{aligned}
Y_{i-1} + Z_{i-1} &= H_{i-1}G^*(i,m)' + M_{i-1}G^*(i,m) + D_{i-1}G^*(i,m)' \\
&= H_{i-1}G^*(i,m)' + M_{i-1}G^*(i,m) + H_{i-1}T(i+1,m+1)'G^*(i,m)' \\
&= H_{i-1}G^*(i,m)' + M_{i-1}G^*(i,m) \\
&= Y_{i-1} + M_{i-1}G^*(i,m)
\end{aligned}$$

Given that the consideration of bytes is of interest, it must be assumed that $S(m+1,z)$ is produced for every byte. The assumption throughout the study is that S, or the changed S, are produced on byte boundaries. Formally, $S(m+1,z)$ is produced for $m = (b \times 8) - 1$, such that b corresponds to the enumeration of the bytes, i.e. $b = 0, 1, 2, \ldots n-1$ for an n byte adder.

If the requirement is placed on equation (4.1) such that when the carry is to be masked, the pseudo-carry must also be masked, then the following results, since the pseudo-carry will be forced to the "zero" state.

$$=> SUM_{i-1} = Y_{i-1} + Z_{i-1} \quad (4.1)$$

This, however, is not enough to mask the carry. The SUM equation must be altered to insure that it will be equivalent to the SUM with the carry-in equal to zero. The following results.

THEOREM 1: The SUM, computed by $$SUM_{i-1} = (W_{i-1} + Z_{i-1})S(m+1,z) + (Y_{i-1} + E_{i-1})S(m+1,z)'$$

where $$E_{i-1} = M_{i-1}(G^*(i,m) + T_i'MASK_b)$$

with $MASK_b$ being the mask condition for the byte in question (b is the byte number), is equivalent either to addition or to addition with the carry forced to "zero".

PROOF

Case 1:

For $MASK_b = $ '1' and $S(m+1,z) = $ '0', i.e. masking the carry, $$SUM_{i-1} = (W_{i-1} + Z_{i-1})S(m+1,z) + (Y_{i-1} + E_{i-1})S(m+1,z)'$$

-continued $$\begin{aligned}
&= Yi-1 + Ei - 1 \\
&= Hi - 1G^*(i,m')' + Mi - 1(G^*(i,m) + Ti') \\
&= Hi - 1G^*(i,m)' + Hi - 1Ti'(G^*(i,m) + Ti') + \\
&\quad Hi - 1'Ti(G^*(i,m) + Ti') \\
&= Hi - 1G^*(i,m)' + Hi - 1Ti' + \\
&\quad Hi - 1'TiG^*(i,m) \\
&= Hi - 1(G^*(i,m)' + Ti') + Hi - 1'TiG^*(i,m) \\
&= Hi - 1(G^*(i,m)Ti)' + Hi - 1'G(i,m) \\
&= Hi - 1G(i,m)' + Hi - 1'G(i,m) \\
&= Hi - 1 \ V \ G(i,m)
\end{aligned}$$

which is equivalent to the addition when the carry-in='0'.

Case 2:
For MASKb='0', i.e. normal addition, $$\begin{aligned}
\text{SUM}i-1 &= (Wi-1+Zi-1)S(m+1,z) + \\
&\quad (Yi-1+Ei-1)S(m+1,z)' \\
&= (Wi-1+Zi-1)S(m+1,z) + \\
&\quad (Yi-1+Mi-1G^*(i,m))S(m+1,z)' \\
&= (Wi-1+Zi-1)S(m+1,z) + \\
&\quad (Yi-1+Zi-1)S(m+1,z)'
\end{aligned}$$

which is equivalent to the SUM.

Thus, the SUM equation which allows masking of the carry into the group, is as follows.

$$\underline{\text{SUM}}i-1 = (Wi-1+Zi-1)S(m+1,z) \\
+ (Yi-1+Ei-1)S(m+1,z)' \quad (4.2)$$

In order to mask off the pseudo-carry, thus insuring that the above requirements are met, MASKb must also be applied to the pseudo-carry equation. It is as follows.

THEOREM 2: The pseudo-carries, computed by $$=> \quad (3.4)$$

$$S(m+1,z) = \text{MASK}b'G^*(m+1,z) + \\
\text{MASK}b'T(m+2,z+1)S(z+1,k) \quad (4.3)$$

will mask the S as required by THEOREM 1.

PROOF

Case 1:
For MASKb='1', i.e. masking the carry, $$\begin{aligned}
S(m+1,z) &= \text{MASK}b'G(m+1,z) + \\
&\quad \text{MASK}b'T(m+2,z+1)S(z+1,k) \\
&= 0 + 0 \\
&= 0
\end{aligned}$$

which is the required state for masking the carry.

Case 2:
For MASKb='0', i.e. normal addition, $$\begin{aligned}
S(m+1,z) &= \text{MASK}b'G^*(m+1,z) + \\
&\quad \text{MASK}b'T(m+2,z+1)S(z+1,k) \\
&= G^*(m+1,z) + T(m+2,z+1)S(z+1,k)
\end{aligned}$$

which is the pseudo-carry for normal addition.

5.0 Setting The Carry

For byte subtraction, the carry into the byte participating in the subtraction, must be set to the "on" state. Subtraction will then be performed as long as the one's complement of the subtrahend is presented to the adder input. However, only the byte of the subtrahend participating in the subtraction is to be complemented. All other bytes of the subtrahend must remain as zeros.

Additionally, the carry into the more significant byte adjacent to the byte participating in the subtraction must be masked off so that it will not affect the value as presented to the SUM.

Only the setting of the carry-in is covered in this section. The masking of the carry is the same as is discussed in the previous section. For more detail, refer to the previous section.

If the requirement is placed on equation (4,1) such that when the carry is to be set, the pseudo-carry must also be set, then the following results, since the pseudo-carry will be forced to the "one" state.

$$=> \text{SUM}i-1 = Wi-1+Zi-1 \quad (4.1)$$

This, however, is not enough to set the carry. The SUM equation must again be altered slightly to insure that it will be equivalent to the SUM with the carry-in equal to one. The following results.

THEOREM 3: The SUM equations, computed by $$\text{SUM}i-1 = (Ji-1+Ki-1)S(m+1,z) + (Yi-1 + Zi-1)S(m+1,z)'$$

where $$Ji-1 = Mi-1T(i+1,m)(Tm+1+\text{SET}b)$$

$$Ki-1 = Mi-1G^*(i,m) + Hi-1(T(i+1,m)(Tm+1+\text{SET}b))'G^*(i,m)'$$

with SETb being the set condition for the byte in question (b is the byte number), is equivalent to the addition with the carry forced to "one".

PROOF

Case 1:
For SETb='1' and S(m+1,z)='1', $$\begin{aligned}
\text{SUM}i-1 &= (Ji-1+Ki-1)S(m+1,z) + \\
&\quad (Yi-1+Zi-1)S(m+1,z)' \\
&= Ji-1+Ki-1 \\
&= Mi-1T(i+1,m) + Mi-1G^*(i,m) + \\
&\quad Hi-1T(i+1,m)'G^*(i,m)' \\
&= Mi-1(T(i+1,m) + G^*(i,m)) + \\
&\quad Hi-1T(i+1,m)'G^*(i,m)' \\
&= Hi-1Ti'(T(i+1,m) + G^*(i,m)) + \\
&\quad Hi-1'Ti(T(i+1,m) + G^*(i,m)) + \\
&\quad Hi-1T(i+1,m)'G^*(i,m)' \\
&= Hi-1Ti' + Hi-1T(i+1,m)'G^*(i,m)' + \\
&\quad Hi-1'Ti(T(i+1,m) + G^*(i,m)) \\
&= Hi-1(Ti' + T(i+1,m)'G^*(i,m)') + \\
&\quad Hi-1'Ti(T(i+1,m) + G^*(i,m)) \\
&= Hi-1(Ti(T(i+1,m) + G^*(i,m))' + \\
&\quad Hi-1'Ti(T(i+1,m) + G^*(i,m)) \\
&= Hi-1(T(i,m) + G(i,m))' + \\
&\quad Hi-1'(T(i,m) + G(i,m)) \\
&= Hi-1 \ V \ (T(i,m) + G(i,m))
\end{aligned}$$

which is equivalent to the addition when the carry-in='1'.

Case 2:
For SETb='0', i.e. normal addition, $$\begin{aligned}
\text{SUM}i - 1 &= (Ji - 1 + Ki - 1)S(m + 1,z) + \\
&\quad (Yi - 1 + Zi - 1)S(m + 1,z)' \\
&= (Mi - 1T(i + 1,m + 1) + \\
&\quad Ki - 1)S(m + 1,z) + \\
&\quad (Yi - 1 + Zi - 1)S(m + 1,z)' \\
&= (Wi - 1 + Mi - 1G^*(i,m) + \\
&\quad Hi - 1T(i + 1,m + 1)'G^*(i,m)')S(m + 1,z) + \\
&\quad (Yi - 1 + Zi - 1)S(m + 1,z)' \\
&= (Wi - 1 + Zi - 1)S(m + 1,z) + \\
&\quad (Yi - 1 + Zi - 1)S(m + 1,z)'
\end{aligned}$$

which is equivalent to the addition.

Thus, the SUM which allows setting of the carry into the group, is as follows.

$$\text{SUM}i-1 = (Ji-1+Ki-1)S(m+1,z)+(Yi-1+Zi-1)S(m+1,z)' \quad (5.1)$$

In order to set the pseudo-carry, thus insuring the above requirements are met, SETb must also be applied to the pseudo-carry equation. It is as follows.

THEOREM 4: The pseudo-carry, computed by (3.4) yields:

$$S(m+1,z) = G^*(m+1,z) + T(m+2,z+1)S(z+1,k) + \text{SET}b \quad (5.2)$$

with set S as required by THEOREM 3.

PROOF

Case 1:
For SETb='1', i.e. setting the carry, $$\begin{aligned}
S(m + 1,z) &= G^*(m + 1,z) + \\
&\quad T(m + 2,z + 1)S(z + 1,k) + \text{SET}b \\
&= G^*(m + 1,z) + T(m + 2,z + 1)S(z + 1,k) + 1 \\
&= 1
\end{aligned}$$

which is the required state for setting the carry.

Case 2:
For SETb='0', i.e. normal addition, $$\begin{aligned}
S(m + 1,z) &= G^*(m + 1,z) + \\
&\quad T(m + 2,z + 1)S(z + 1,k) + \text{SET}b \\
&= G^*(m + 1,z) + T(m + 2,z + 1)S(z + 1,k) + 0 \\
&= G^*(m + 1,z) + T(m + 2,z + 1)S(z + 1,k)
\end{aligned}$$

which is the pseudo-carry for normal addition.

6.0 The SUM Equations

In order for the combined functions of setting and masking the carry-in to be applied to the same set of addition equations, it is mandatory that MASKb and SETb be mutually exclusive (for the same byte), i.e., if MASK0 is "on", SET0 must be "off" and vice versa.

| MASKb | SETb | Definition |
|-------|------|------------|
| 0 | 0 | Normal Addition |
| 0 | 1 | Force CIN = 1 |
| 1 | 0 | Force CIN = 0 |
| 1 | 1 | Undefined |

Therefore, for byte addition, if byte 1 of the addend is to be added to byte 1 of the augend, MASK0 should be turned "on". MASK0, as applied to the SUM equations of byte 0, will insure that any carry propagation from byte 1 will not affect byte 0.

Furthermore, for byte subtraction (besides the masking of the carry, as stated in the previous paragraph), if byte 1 of the subtrahend is to be subtracted from byte 1 of the minued, SET1 should be turned "on". This will force the carry into byte 1, thus, allowing proper subtraction.

The following set of equations result.

THEOREM 5: The set of equations $$\text{SUM}i-1 = (Ji-1+Ki-1)S(m+1,z)+(Yi-1+Ei-1)S(m+1,z)' \quad (6.1)$$

$$S(m+1,z) = \text{MASK}b'G^*(m+1,z) + \text{MASK}b'T(m+2,z+1)S(z+1,k) + \text{SET}b \quad (6.2)$$

where $$m = (b \times 8) - 1$$

and b corresponds to the enumeration of the bytes $$Ji-1 = Mi-1T(i+1,m)(Tm+1+\text{SET}b)$$

$$Ki-1 = Mi-1G^*(i,m)+Hi-1(T(i+1,m)(Tm+1+\text{SET}b))'G^*(i,m)'$$

$$Yi-1 = Hi-1G^*(i,m)'$$

and $$Ei-1 = Mi-1(G^*(i,m)+Ti'\text{MASK}b)$$

are equivalent to either addition, byte addition or byte subtraction.

PROOF

Case 1: Normal addition for all bytes
For SETb='0' and MASKb='0', $$\begin{aligned}
S(m + 1,z) &= \text{MASK}b'G^*(m + 1,z) + \\
&\quad \text{MASK}b'T(m + 2,z + 1)S(z + 1,k) + \text{SET}b \\
&= G^*(m + 1,z) + T(m + 2,z + 1)S(z + 1,k)
\end{aligned}$$

which is equivalent to the pseudo-carry for addition.
And $$\begin{aligned}
\text{SUM}i - 1 &= (Ji - 1 + Ki - 1)S(m + 1,z) + \\
&\quad (Yi - 1 + Ei - 1)S(m + 1,z)' \\
&= (Mi - 1T(i + 1,m + 1) + \\
&\quad Mi - 1G^*(i,m) + Hi - \\
&\quad 1T(i + 1,m + 1)'G^*(i,m)')S(m + 1,z) + \\
&\quad (Yi - 1 + Mi - 1G^*(i,m))S(m + 1,z)' \\
&= (Wi - 1 + Zi - 1)S(m + 1,z) + \\
&\quad (Yi - 1 + Zi - 1)S(m + 1,z)'
\end{aligned}$$

which is equivalent to the addition.

Case 2: Byte subtraction or byte addition
Part 1: Masking the carry
For SETb='0' and MASKb='1', $$\begin{aligned}
S(m + 1,z) &= \text{MASK}b'G^*(m + 1,z) + \\
&\quad \text{MASK}b'T(m + 2,z + 1)S(z + 1,k) + \text{SET}b \\
&= 0
\end{aligned}$$

-continued

And $$SUM_{i-1} = (J_{i-1} + K_{i-1})S(m+1,z) + (Y_{i-1} + E_{i-1})S(m+1,z)'$$
$$= Y_{i-1} + E_{i-1}$$

which was proven in section 4.0 to be equivalent to the SUM when the carry into the group = '0'.

Part 2: Setting the carry

For $SETb = '1'$ and $MASKb = '0'$,
$$S(m+1,z) = MASKb'G^*(m+1,z) + MASKb'T(m+2,z=1)S(z+1,k) + SETb$$
$$= G^*(m+1,z) + T(m+2,z=1)S(z+1,k) + 1$$
$$= 1$$

And $$SUM_{i-1} = (J_{i-1} + K_{i-1})S(m+1,z) + (Y_{i-1} + E_{i-1})S(m+1,z)'$$
$$= J_{i-1} + K_{i-1}$$

which was proven in section 5.0 to be equivalent to the SUM when the carry into the group = '1'.

If byte addition must be performed on byte b, then the carry into byte b−1 must be masked. The implication is that for all bytes, except byte b−1, SET=MASK=0 and for byte b−1, SETb−1=0 and MASKb−1=1.

If byte subtraction must be performed on byte b, then the carry into byte b must be set and the carry into byte b−1 must be masked. This is equivalent to forcing SET=MASK=0 for all bytes except byte b and b−1. For byte b, MASKb=0 and SETb=1, and for byte b−1, MASKb−1=1 and SETb−1=0.

7.0 The Boundary Conditions

If an implementation of equations (6.1) and (6.2) is attempted, it can be seen that a problem occurs when $i-1 \geq m-1$. Since there is no definition for $T(j,k)$ and $G^*(j,k)$ when $j > k$ (see definitions 1 and 2 in section 3), the equations do not apply. Therefore new equations for the addition must be added for $SUM_{i-1}$ when $i-1 \geq m-1$ which occurs for bits 6 and 7 of the byte.

7.1 The SUM Equation For Bits 6, 14, 22, Etc.

In order to derive the SUM equation for bit $i+6$, where $i=0, 8, 16$, etc., equation (3.3) is used as a starting point. Then the results when the set and mask are applied are added to the equation along with SETb and MASKb such that the appropriate portion results when SETb=1, MASKb=1, or both are zero.

(3.3) =>
$$(7.1)\ SUM_{i+6} = M_{i+6}G_{i+7} + M_{i+6}T_i + 8S(i+8,i+15) + H_{i+6}G_{i+7}T_i + 8' + H_{i+6}G_{i+7}'S(i+8,i+15)'$$
$$= (M_{i+6}G_{i+7} + M_{i+6}T_i + 8 + H_{i+6}G_{i+7}T_i + 8')S(i+8,i+15) + (M_{i+6}G_{i+7} + H_{i+6}G_{i+7}T_i + 8' + H_{i+6}G_{i+7}')S(i+8,i+15)'$$
$$= (H_{i+6}T_i + 7'G_{i+7} + H_{i+6}T_i + 7G_{i+7} + H_{i+6}T_i + 7'T_i + 8 + H_{i+6}'T_i + 7T_i + 8 + H_{i+6}G_{i+7}'T_i + 8')S(i+8,i+15) + (H_{i+6}T_i + 7'G_{i+7} + H_{i+6}'G_{i+7} + 7 + H_{i+6}'T_i + 7G_{i+7} + 7 +$$
$$H_{i+6}G_{i+7} + 7')S(i+8,i+15)'$$
$$= (H_{i+6}G_{i+7} + 7 + H_{i+6}T_i + 7'T_i + 8 + H_{i+6}'T_i + 7T_i + 8 + H_{i+6}G_{i+7}'T_i + 8')S(i+8,i+15) + (H_{i+6}'G_{i+7} + 7 + H_{i+6}G_{i+7} + 7')S(i+8,i+15)'$$
$$= (H_{i+6}G_{i+7} + 7 + H_{i+6}T_i + 7' + H_{i+6}'T_i + 7T_i + 8 + H_{i+6}G_{i+7}'T_i + 8')S(i+8,i+15) + (H_{i+6}'G_{i+7} + 7 + H_{i+6}G_{i+7} + 7')S(i+8,i+15)'$$

When SETb=1 (i.e. CIN=1), we wish the resultant equation to be as follows.

From conventional addition equations,
$$SUM_{i+6} = H_{i+6} V C_{i+7}$$
$$= H_{i+6} V (G_{i+7} + T_{i+7}CIN)$$
$$= H_{i+6} V (G_{i+7} + T_{i+7})$$
$$= H_{i+6} V T_{i+7}$$
$$= H_{i+6}T_i + 7' + H_{i+6}'T_i + 7$$

Therefore, when SETb=1 and $S(i+8,i+15)=1$, $SUM_{i+6}$ must be equal to $M_{i+6}$. The following results.

THEOREM 6: The SUM, computed by $$(7.2)\ SUM_{i+6} = (H_{i+6}'G_{i+7}SETb' + H_{i+6}'T_i + 7' + H_{i+6}'T_i + 7SETb + H_{i+6}'T_i + 7T_i + 8SETb' + H_{i+6}G_{i+7}'T_i + 8'SETb')S(i+8,i+15) + (H_{i+6}'G_{i+7} + 7 + H_{i+6}G_{i+7} + 7')S(i+8,i+15)'$$
$$= (H_{i+6}'G_{i+7}SETb' + H_{i+6}T_i + 7' + H_{i+6}'T_i + 7SETb + H_{i+6}'T_i + 7T_i + 8 + H_{i+6}G_{i+7}'T_i + 8'SETb')S(i+8,i+15) + (H_{i+6}'G_{i+7} + 7 + H_{i+6}G_{i+7} + 7')S(i+8,i+15)'$$

is equivalent to either addition, byte addition or byte subtraction for the seventh bit position of a byte.

When MASKb=1 (i.e. CIN=0), we wish the resultant equation to be as follows.

From conventional addition equations,
$$SUM_{i+6} = H_{i+6} V C_{i+7}$$
$$= H_{i+6} V (G_{i+7} + T_{i+7}CIN)$$
$$= H_{i+6} V G_{i+7}$$
$$= H_{i+6}G_{i+7}' + H_{i+6}'G_{i+7}$$

It can be seen in equation (7.2) that when MASKb=1 and $S(i+8,i+15)=0$, the results are already what is wished for CIN=0. Therefore no further manipulation of the SUM equation is required.

PROOF

Case 1:
For SETb='0' and MASKb='0', i.e., normal addition, $$S(m+1,z) = MASKb'G^*(m+1,z) + MASKb'T(m+2,z=1)S(z+1,k) + SETb$$
$$= G^*(m+1,z) + T(m+2,z=1)S(z+1,K)$$

which is equivalent to the pseudo-carry for addition.

And $$SUM_{i+6} = (H_{i+6}'G_{i+7}SETb' + H_{i+6}T_i + 7' + H_{i+6}'T_i + 7SETb + H_{i+6}'T_i + 7T_i + 8 + H_{i+6}G_{i+7}'T_i +$$

-continued
$$8'\text{SET}b')S(i + 8, i + 15) + (Hi + 6'Gi + 7 + Hi + 6Gi + 7')S(i + 8, i + 15)'$$
$$= (Hi + 6'Gi + 7 + Hi + 6Ti + 7' + Hi + 6'Ti + 7Ti + 8 + Hi + 7'Ti + 8')S(i + 8, i + 15) + (Hi + 6'Gi + 7 + Hi + 6Gi + 7')S(i + 8, i + 15)'$$

which is equivalent to the addition for bit $i+6$ and can be seen as the final reduction of equation (7.1) above.

Case 2:

For SETb='0', and MASKb='1', i.e. masking the carry, $$S(m + 1, z) = \text{MASK}b'G^*(m + 1, z) + \text{MASK}b'T(m + 2, z + 1)S(z + 1, k) + \text{SET}b$$
$$= 0$$

And $$\text{SUM}i + 6 = (Hi + 6'Gi + 7\text{SET}b' + Hi + 6Ti + 7' + Hi + 6'Ti + 7\text{SET}b + Hi + 6'Ti + 7Ti + 8 + Hi + 6Gi + 7'Ti + 8'\text{SET}b')S(i + 8, i + 15) + (Hi + 6'Gi + 7 + Hi + 6Gi + 7')S(i + 8, i + 15)'$$
$$= Hi + 6'Gi + 7 + Hi + 6Gi + 7'$$

which is equivalent to SUM$i+6$ when the carry into the group='0'.

Case 3:

For SETb='1' and MASKb='0', i.e. setting the carry, $$S(m + 1, z) = \text{MASK}b'G^*(m + 1, z) + \text{MASK}b'T(m + 2, z + 1)(z + 1, k) + \text{SET}b$$
$$= G^*(m + 1, z) + T(m + 2, z + 1)S(z + 1, k) + 1$$
$$= 1$$

And $$\text{SUM}i + 6 = (Hi + 6'Gi + 7\text{SET}b' + Hi + 6Ti + 7' + Hi + 6'Ti + 7\text{SET}b + Hi - 6'Ti + 7Ti + 8 + Hi + 6Gi + 7'Ti + 8'\text{SET}b')S(i + 8, i + 15) + (Hi + 6'Gi + 7 + Hi + 6Gi + 7')S(i + 8, i + 15)'$$
$$= Hi + 6Ti + 7' + Hi + 6'Ti + 7 + Hi + 6'Ti + 7Ti + 8$$
$$= Hi + 6Ti + 7' + Hi + 6'Ti + 7$$

which is equivalent to SUM$i+6$ when the carry into the group='1'.

With considerations analogous to THEOREM 5, it can be concluded that byte addition, addition, and subtraction will be performed for the seventh bit of the byte.

7.2 The SUM Equation For Bit 7, 15, 23, Etc.

In order to derive the SUM equation for bit $i+7$, where $i=0, 8, 16$, etc., equation (3.1) is used as a starting point. Then the results when the set and mask are applied are added to the equation along with SETb and MASKb such that the appropriate portion results when SETb=1, MASKb=1, or both are zero.

=> (3.1)

$$\text{SUM}i+7 = Mi+7S(i+8, i+15) + Hi+7S(i+8, i+15)' \quad (2.3)$$

When SETb=1 (i.e. CIN=1), we wish the resultant equation to be as follows.

From conventional addition equations, $$\text{SUM}i + 7 = Hi + 7 \lor Ci + 8$$
$$= Hi + 7 \lor CIN$$
$$= Hi + 7'$$

Therefore, when SETb=1 and $S(i+8, i+15)=1$, SUM$i+7$ must be equal to $Hi+7'$. The following results.

THEOREM 7: The SUM, computed by $$(7.4) \text{SUM}i + 7 = (Mi + 7\text{SET}b' + Hi + 7'\text{SET}b)S(i + 8, i + 15) + Hi + 7S(i + 8, i + 15)'$$
$$= (Hi + 7Ti + 8'\text{SET}b' + Hi + 7'Ti + 8\text{SET}b' + Hi + 7'\text{SET}b)S(i + 8, i + 15) + Hi + 7S(i + 8, i + 15)'$$
$$= (Hi + 7Ti + 8'\text{SET}b' + Hi + 7'Ti + 8 + Hi + 7'\text{SET}b)S(i + 8, i + 15) + Hi + 7S(i + 8, i + 15)'$$

is either equivalent to addition, byte addition or byte subtraction for the eighth bit position of the byte.

When MASKb=1 (i.e. CIN=0), we wish the resultant equation to be as follows. From conventional addition equations, $$\text{SUM}i + 7 = Hi + 7 \lor Ci + 8$$
$$= Hi + 7 \lor CIN$$
$$= Hi + 7$$

It can be seen in equation (7.2) that when MASKb=1 and $S(i+8, i+15)=0$, the results are already what is wished for CIN=0. Therefore no further manipulation of the SUM equation is required.

PROOF

Case 1:

For SETb='0' and MASKb='0', i.e., normal addition, $$S(m + 1, z) = \text{MASK}b'G(m + 1, z) + \text{MASK}b'T(m + 2, z + 1)S(z + 1, k) + \text{SET}b$$
$$= G^*(m + 1, z) + T(m + 2, z + 1)S(z + 1, k)$$

which is equivalent to the pseudo-carry for addition. And $$\text{SUM}i + 7 = (Hi + 7Ti + 8'\text{SET}b + Hi + 7'Ti + 8 + Hi + 7'\text{SET}b)S(i + 8, i + 15) + Hi + 7S(i + 8, i + 15)'$$
$$= (Hi + 7Ti + 8' + Hi + 7'Ti + 8)S(i + 8, i + 15) + Hi + 7S(i + 8, i + 15)'$$
$$= Mi + 7S(i + 8, i + 15) + Hi + 7S(i + 8, i + 15)'$$

Which is equivalent to the addition for bit $i+7$.

Case 2:

For SETb='0', and MASKb='1', i.e. masking the carry, $$S(m+1,z) = \text{MASK}b'G^*(m+1,z) + \text{MASK}b'T(m+2,z+1)S(z+1,k) + \text{SET}b$$
$$= 0$$

And $$\text{SUM}i+7 = (Hi+7Ti+8'\text{SET}b' + Hi+7'Ti+8+Hi+7'\text{SET}b)S(i+8,i+15) +$$
$$Hi+7S(i+8,i+15)'$$
$$= Hi+7$$

which is equivalent to SUMi+7 when the carry into the group='0'.

Case 3:

For SETb='1' and MASKb='0', i.e. setting the carry, $$S(m+1,z) = \text{MASK}b'G^*(m+1,z) + \text{MASK}b'T(m+2,z+1)S(z+1,k) + \text{SET}b$$
$$= G^*(m+1,z) + T(m+2,z+1)S(z+1,k) + 1$$
$$= 1$$

And $$\text{SUM}i+7 = (Hi+7Ti+8'\text{SET}b' + Hi+7'Ti+8+Hi+7'\text{SET}b)S(i+8,i+15) +$$
$$Hi+7S(i+8,i+15)'$$
$$= Hi+7'Ti+8+Hi+7'$$
$$= Hi+7'$$

which is equivalent to SUMi+7 when the carry into the group='1'.

With considerations analogous to THEOREM 5, it can be concluded that byte addition, addition, and subtraction will be performed for the eighth bit of the byte.

8.0 The Final Equations

The general SUM equations that include byte addition and subtraction, as described in section 6.0, are restated here as equations (8.1) and (8.2) below.

$$\text{SUM}i-1 = (Ji-1+Ki-1)S(m+1,z)+(Yi-1+Ei-1)S(m+1,z)' \quad (8.1)$$

$$S(m+1,z) = \text{MASK}b'G^*(m+1,z)+\text{MASK}b'T(m+2,z+1)S(z+1,k)\,\text{SET}b \quad (8.2)$$

where
$m=(b\times 8)-1$ and b corresponds to the enumeration of the bytes
$Ji-1 = Mi-1T(i+1,m)Tm+1+\text{SET}b)$
$Ki-1 = Mi1G^*(i,m)+Hi-1(T(i+1,m)(Tm+1+\text{SET}b))'G^*(i,m)'$
$Yi-1 = Hi-1G^*(i,m)'$ and
$Ei-1 = Mi-1(G^*(i,m)+Ti'\text{MASK}b)$ For bit 6 of each byte, i.e., bits 6, 14, 22, etc., equation (8.3) below, should be used, where i=0, 8, 16, ...

$$(8.3)\ \text{SUM}i+6 = (Hi+6'Gi+7\text{SET}b' + Hi+6Ti+7' + Hi+6'Ti+7\text{SET}b + Hi+6Ti+7Ti+8+Hi+6Gi+7'Ti+8'\text{SET}b')S(i+8,i+15) +$$
$$(Hi+6'Gi+7 + Hi+6Gi+7')S(i+8,i+15)'$$

For bit 7 of each byte, i.e., bits 7, 15, 23, etc., equation (8.4) below, should be used, where i=0, 8, 16, ...

$$(8.4)\ \text{SUM}i+7 = (Hi+7Ti+8'\text{SET}b' + Hi+7'Ti+8+Hi+7'\text{SET}b)S(i+8,i+15) +$$
$$Hi+7S(i+8,i+15)'$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of processing a particular byte of a multibyte A-operand and a multibyte B-operand to produce a processed result, said method comprising the steps of:
   operating on a first subset of consecutive bits of the particular byte of the A-operand and the B-operand yielding a first result;
   operating on at least one further subset of consecutive bits of the particular byte of the A-operand and the B-operand, which further subset does not overlap said first subset, yielding at least one further result; and
   concatenating said first result and said at least one further result together thereby producing said processed result without any carry-in effect from or a carry-out effect on adjacent bits not included in the particular byte of the multibyte operands.

2. The method of claim 1, wherein said first subset of bits is bits zero through five, said one further subset of bits being bit six, the method further comprising the steps of:
   operating on bit seven of the particular byte of the A-operand and the B-operand yielding a still further result; and
   concatenating said first result, said one further result, and said still further result together thereby producing said processed result.

3. An arithmetic unit for processing an A-operand and a B-operand in accordance with an instruction, said A-operand being a first variable, said arithmetic unit comprising:
   means for modifying the B-operand in response to said instruction thereby producing a modified B-operand, the modified B-operand being a second variable;
   means for generating further signals representing a third variable in response to said instruction; and
   processing means responsive to said A-operand, said modified B-operand, and said further signals for processing the A-operand and the modified B-operand thereby producing a processed result wherein any non-participating bits of the A-operand are passed directly through to the processed result, said processed result being a function of a set of variables, said set of variables including said first variable, said second variable, and said third variable.

4. The arithmetic unit of claim 3, wherein said A-operand, said B-operand and said modified B-operand each comprise a plurality of bytes, said processing means processing each byte of said A-operand and each byte of said modified B-operand until all of said bytes are processed, said processing means processing a first subset of consecutive bits of a particular byte of the A-operand and the modified B-operand yielding a first result and processing at least one second subset of consecutive bits of said particular byte of the A-operand and the modified B-operand yielding at least one second result, with said second subset of bits not overlapping said first subset of bits, and concatenating the first result and said at least one second result together yielding a portion of said processed result corresponding with said particular byte.

5. The arithmetic unit of claim 4, wherein said processing means processes a third subset of consecutive bits of said particular byte of the A-operand and the modified B-operand yielding at least a third result, with said third result not overlapping said first and second subsets of bits, and wherein said processing means concatenates a said first result and said at least second result and said third result together for each byte of the A-operand and the modified B-operand until said processed result is produced.

6. The arithmetic unit of claim 4, wherein said first subset of bits comprise bits zero through five and said at least one second subset of bits comprise bit six, said processing means processing bit seven of said particular byte of the A-operand and the modified B-operand yielding a third result, said processing means concatenating said first result, said second result, and said third result together to yield said portion of said processed result corresponding to said particular byte, said processing means concatenating said first result, said second result and said third result for each byte of the A-operand and the modified B-operand until said processed result is produced.

7. The arithmetic unit of claim 3, wherein said arithmetic unit is a binary adder, and wherein said processing means comprises:
  further variable generating means responsive to said set of variables for generating further variables in response thereto; and
  sum circuit means responsive to receiving input of said further variables for generating said processed result in accordance with said further variables, said processed result being generated from said sum circuit means by concatenation of at least two different results.

8. The arithmetic unit of claim 7, wherein said sum circuit means adds a particular byte of the A-operand to a corresponding particular byte of the modified B-operand, and wherein said sum circuit means is represented by three equations, a first equation representing a first processed result corresponding to bits zero through five of said particular byte of the A-operand and the modified B-operand, a second equation representing a second processed result corresponding to bit six of the corresponding particular bytes, and a third equation representing a third processed result corresponding to bit seven of the corresponding particular bytes, said equations being the first, second and third processed results as a function of said further variables, said sum circuit means concatentating said first processed result, said second processed result and said third processed result together thereby generating said processed result.

9. The arithmetic unit of claim 8 wherein said sum circuit means for obtaining said first processed result is described by the following Boolean expression:

$$SUMi-1 = (Ji-1+Ki-1)S(m+1, z) + (Yi-1+Ei-1)S(m+1,z)'$$

wherein
  V = exclusive OR
  B' = the one's complement of B
  SUMi−1 = the SUM at bit position i−1
  Hi = Ai V Bi
  T(i,m) = TiTi+1Ti+2 . . . Tm−1Tm with Ti = Ai+Bi
  S(m+1,z) = MASKb'G*(m+1,z) + MASKb'T(m+2,z+1)S(z+1,k) + SETb
  G*(i,m) = Gi+Gi+1+Ti+1Gi+2+Ti+1Ti+2 Gi+3+ . . . +Ti+1Ti+2Ti+3 . . . Tm−1Gm
  Gi = Ai Bi
  m = (b×8)−1 and b corresponds to the enumeration of the bytes
  Ji−1 = Mi−1T(i+1, m)(Tm+1+SETb)
  Ki31  1 = Mi−1G*(i,m)+Hi−1(T(i+1,m)(Tm+1+SETb))'G*(i,m)'
  Yi−1 = Hi−1G*(i,m)'
  Mi = Hi V Ti+1
  Ei−1 = Mi−1(G*(i,m)+Ti'MASKb)
  $A_i$ is the ith bit of the A-operand and $B_i$ is the ith bit of the B-operand,
  i is an integer,
  0 is the most significant bit position and n is the least significant bit position of the result and bit position i of the result is less significant than bit position i−1 and more significant than bit position i+1.

10. The arithmetic unit of claim 8 wherein said sum circuit means for obtaining said second processed result is described by the following Boolean expression:

$$SUMi+6 = (Hi+6'Gi+7SETb+Hi+6Ti+7'+Hi+6'Ti+7SETb+Hi+6'Ti+7Ti+8+Hi+6Gi+7'Ti+8'SETb')S(i+8,i+15)+(Hi+6'Gi+7+Hi+6Gi+7')S(i+8,i+15)'$$

wherein
  V = exclusive OR
  B' = the one's complement of B
  SUMi−1 = the SUM at bit position i−1
  Hi = Ai V Bi
  T(i,m) = TiTi+1Ti+2 . . . Tm−1Tm with Ti = Ai+Bi
  S(m+1,z) = MASKb'G*(m+1,z) + MASKb'T(m+2,z+1)S(z+1,k) + SETb
  G*(i,m) = Gi+Gi+1+Ti+1Gi+2+Ti+1Ti+2 Gi+3+ . . . +Ti+1Ti+2Ti+3 . . . Tm−1Gm
  Gi = AiBi
  m = (b×8)−1 and b corresponds to the enumeration of the bytes
  $A_i$ is the ith bit of the A-operand and $B_i$ is the ith bit of the B-operand,
  i is an integer,
  0 is the most significant bit position and n is the least significant bit position of the result and bit position i of the result is less significant than bit position i−1 and more significant than bit position i+1.

11. The arithmetic unit of claim 8 wherein said sum circuit means for obtaining said third processed result is described by the following Boolean expression:

$$SUMi+7 = (Hi+7Ti+8'SETb'+Hi+7Ti+8+Hi+7'SETb)S(i+8,i+15)+Hi+7S(i+8,i+15)'$$

wherein
- $V$ = exclusive OR
- $B'$ = the one's complement of B
- $SUM_{i-1}$ = the SUM at bit position $i-1$
- $H_i = A_i \, V \, B_i$
- $T(i,m) = T_i T_{i+1} T_{i+2} \ldots T_{m-1} T_m$ with $T_i = A_i + B_i$
- $S(m+1,z) = MASKb'G^*(m+1,z) + MASKb'T(m+2,z+1)S(z+1,k) + SETb$
- $G^*(i,m) = G_i + G_{i+1} + T_{i+1} G_{i+2} + T_{i+1} T_{i+2} G_{i+3} + \ldots + T_{i+1} T_{i+2} T_{i+3} \ldots T_{m-1} G_m$
- $G_i = A_i B_i$
- $m = (b \times 8) - 1$ and b corresponds to the enumeration of the bytes
- $A_i$ is the ith bit of the A-operand and $B_i$ is the ith bit of the B-operand,
- i is an integer,
- 0 is the most significant bit position and n is the least significant bit position of the result and bit position i of the result is less significant than bit position $i-1$ and more significant than bit position $i+1$.

12. The arithmetic unit of claim 3, wherein said means for modifying modifies the B-operand in a first or second manner in response to a regular addition operation or a regular substraction operation, respectively, and in a third manner in response to a byte addition operation, said processing producing said processed result representative of said byte addition operation when said means for modifying modifies the B-operand in said third manner without any carry-in effect from or carry-out effect on adjacent bits not included in the particular byte addition operation.

13. The arithmetic unit of claim 12, wherein said means for modifying modifies the B-operand in a first or second manner in response to a regular addition or a regular subtraction operation, respectively, and in a fourth manner in response to a byte subtraction operation, said processing means producing said processed result representative of said byte subtraction operation when said means for modifying modifies the B-operand in said fourth manner without any carry-in effect from or carry-out effect on adjacent bits not included in the particular byte addition operation.

14. The arithmetic unit of claim 13 wherein said means for modifying causes a bit-by-bit inversion of the B-operand in response to a regular subtraction operation.

15. The arithmetic unit of claim 12 wherein said means for modifying makes no change to the B-operand in response to a regular addition operation.

16. The arithmetic unit of claim 3 which is capable of processing operands in response to both regular arithmetic instructions as well as byte arithmetic instructions.

17. The arithmetic unit of claim 3 wherein said means for generating further signals comprises logic means for controlling the passing of a carry between two adjacent bytes of data, depending on the nature of the arithmetic operation of the instruction.

18. In a computer, an improved high speed parallel binary adder capable of handling regular arithmetic operations as well as byte arithmetic operations, said binary adder including:
adder circuit means for generating a processed result in response to an arithmetic operation instruction;
first input means connected to said adder circuit means for transmitting a multi-byte A-operand into said adder circuit means;
second input means connected to said adder circuit means for transmitting a form of multi-byte B-operand into said adder circuit means;
third input means connected to said adder circuit means for transmitting carry-control signals into said adder circuit means;
instruction control means connected to said second input means and also to said third input means for indicating whether the arithmetic operation instruction is requesting a regular arithmetic operation or a byte arithmetic operation; and wherein
said adder circuit means further includes additional circuit means connected with said first and third input means for passing any non-participating bits of the A-operand directly through to the processed result.

19. The adder in accordance with claim 18 wherein said additional circuit means implements byte arithmetic operations without any carry-in effect from or any carry-out effect on adjacent bits not included in the particular corresponding bytes which are being processed by the byte arithmetic operation.

20. The adder in accordance with claim 18 wherein the A-operand and the B-operand each includes a plurality of bytes each having eight bits, and wherein said adder circuit means includes sum circuit means for generating a first partial result from a first subset of consecutive bits, and a second partial result from a second subset of consecutive bits, and a third partial result from a third subset of consecutive bits, with none of the subsets of bits overlapping, and where a final processed result is formed by concatenating together said three partial results.

* * * * *